(12) United States Patent  (10) Patent No.: US 8,308,565 B2
Nakanishi et al. (45) Date of Patent: Nov. 13, 2012

(54) PROGRAM, INFORMATION STORAGE MEDIUM, GAME DEVICE FOR GENERATING AN IMAGE IN WHICH A MOVING OBJECT SLIDES DOWN A SLOPE ACCORDING TO AN INCLINATION OF A CONTROLLER

(75) Inventors: Kensuke Nakanishi, Tokyo (JP);
Tomoaki Yasuda, Fujisawa (JP);
Kenichi Shimada, Tokorozawa (JP);
Hisashi Kawamura, Yokohama (JP)

(73) Assignee: Namco Bandai Games Inc., Toyko (JP)

( * ) Notice: Subject to any disclaimer, the term of this patent is extended or adjusted under 35 U.S.C. 154(b) by 1072 days.

(21) Appl. No.: 12/205,462

(22) Filed: Sep. 5, 2008

(65) Prior Publication Data

US 2009/0070093 A1    Mar. 12, 2009

(30) Foreign Application Priority Data

Sep. 11, 2007   (JP) ................... 2007-235619

(51) Int. Cl.
*A63F 9/24* (2006.01)
*A63F 13/00* (2006.01)
*A63F 9/14* (2006.01)
*G06F 17/00* (2006.01)
*G06F 19/00* (2006.01)
*G06F 3/033* (2006.01)
*G09G 5/08* (2006.01)

(52) U.S. Cl. ................. 463/37; 463/4; 463/6; 463/32; 463/36; 463/64; 345/158

(58) Field of Classification Search .......... None
See application file for complete search history.

(56) References Cited

U.S. PATENT DOCUMENTS 6,022,272 A      2/2000 Sano
2001/0021667 A1*  9/2001 Fujimoto et al. ............. 463/36
2007/0111768 A1*  5/2007 Tipping et al. .............. 463/6

(Continued)

FOREIGN PATENT DOCUMENTS

JP        A-10-207341        8/1998

OTHER PUBLICATIONS

"Wii-Boxing—How to Punch Guide," Wii Blog, Jan. 6, 2007.

(Continued)

*Primary Examiner* — Bipin Shalwala
*Assistant Examiner* — Ryan A Lubit
(74) *Attorney, Agent, or Firm* — Oliff & Berridge, PLC

(57) ABSTRACT

A game device calculates a shift angle A based on a magnitude of a velocity vector S of a moving object MO and inclination information that indicates an inclination of a controller, calculates a direction D of the moving object on a slope based on a direction of the velocity vector S of the moving object and the shift angle A, calculates a first force vector P1 in the direction intersecting at right angles on the slope with the direction D of the moving object on the slope based on the inclination information, calculates a second force vector P2 based on a slope angle of the slope, calculates a resultant force vector PS by combining the first force vector P1 and the second force vector P2, updates the velocity vector S of the moving object based on the resultant force vector PS, and updates a position of the moving object MO based on the updated velocity vector.

17 Claims, 15 Drawing Sheets

U.S. PATENT DOCUMENTS

2007/0178974 A1* 8/2007 Masuyama et al. ............ 463/43
2007/0197285 A1* 8/2007 Kamijo ........................... 463/31
2008/0146302 A1* 6/2008 Olsen et al. ...................... 463/7
2008/0214305 A1* 9/2008 Addington et al. ............. 463/36

OTHER PUBLICATIONS

European Search Report issued in corresponding European Application No. EP 08 01 5851, mailed Jun. 4, 2010.

* cited by examiner

PROGRAM, INFORMATION STORAGE MEDIUM, GAME DEVICE FOR GENERATING AN IMAGE IN WHICH A MOVING OBJECT SLIDES DOWN A SLOPE ACCORDING TO AN INCLINATION OF A CONTROLLER

Japanese Patent Application No. 2007-235619, filed on Sep. 11, 2007, is hereby incorporated by reference in its entirety.

BACKGROUND OF THE INVENTION

The present invention relates to a program, an information storage medium, and a game device.

A game device (e.g., ski simulator) that allows the player to simulate skiing by operating an input board has been known. In such a game device, the moving path of the skier may be determined based on the swing operation input and the edging operation input performed using the input board. JP-A-10-207341 discloses such technology, for example.

According to a related-art game device, since the player must simultaneously perform the swing operation input in the horizontal direction and the edging operation input in the vertical direction, the operation becomes complicated.

SUMMARY

According to a first aspect of the invention, there is provided a program that generates an image in which a moving object slides down a slope according to an inclination of a controller, the program causing a computer to function as:

an information acquisition section that acquires inclination information that indicates an inclination of the controller based on a detection result of a detection section that detects information that changes according to an inclination of the controller;

a shift angle calculation section that calculates a shift angle based on the magnitude of a velocity vector of the moving object and the inclination information, and calculates a direction of the moving object on the slope based on the shift angle and a direction of the velocity vector of the moving object;

a first force vector calculation section that calculates a first force vector in a direction intersecting at right angles on the slope with the direction of the moving object on the slope based on the inclination information;

a second force vector calculation section that calculates a second force vector based on a slope angle of the slope;

a resultant force vector calculation section that calculates a resultant force vector by combining the first force vector and the second force vector;

an update section that updates the velocity vector of the moving object based on the resultant force vector, and updates a position of the moving object based on the updated velocity vector; and an image generation section that generates an image including the moving object.

According to a second aspect of the invention, there is provided a computer-readable information storage medium storing the above-described program.

According to a third aspect of the invention, there is provided a game device that generates an image in which a moving object slides down a slope according to an inclination of a controller, the game device comprising:

an information acquisition section that acquires inclination information that indicates an inclination of the controller based on a detection result of a detection section that detects information that changes according to an inclination of the controller;

a shift angle calculation section that calculates a shift angle based on a magnitude of a velocity vector of the moving object and the inclination information, and calculates a direction of the moving object on the slope based on the shift angle and a direction of the velocity vector of the moving object;

a first force vector calculation section that calculates a first force vector in a direction intersecting at right angles on the slope with the direction of the moving object on the slope based on the inclination information;

a second force vector calculation section that calculates a second force vector based on a slope angle of the slope;

a resultant force vector calculation section that calculates a resultant force vector by combining the first force vector and the second force vector;

an update section that updates the velocity vector of the moving object based on the resultant force vector, and updates a position of the moving object based on the updated velocity vector; and an image generation section that generates an image including the moving object.

DETAILED DESCRIPTION OF THE EMBODIMENT

Figure 1:
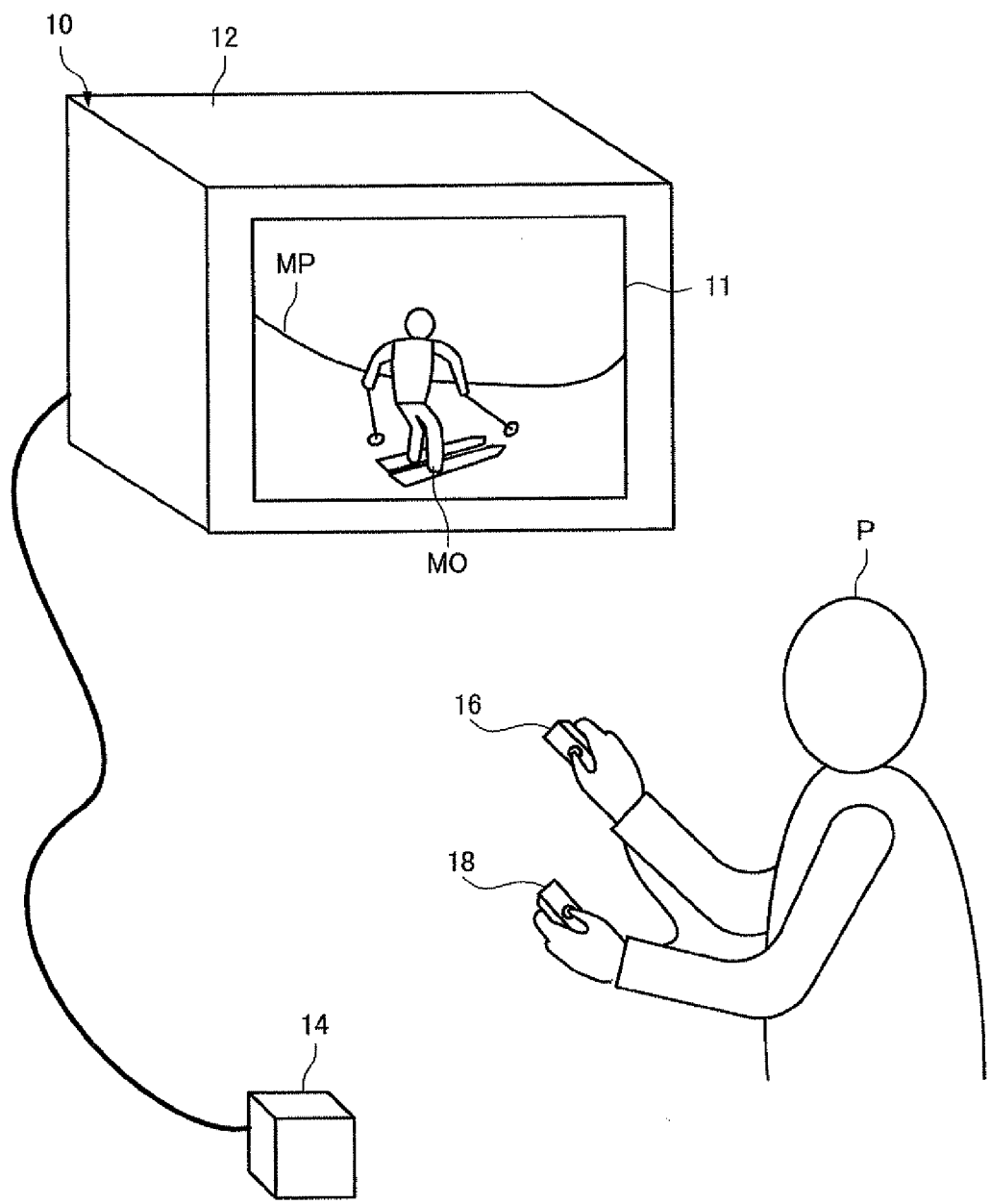
FIG. 1 schematically shows an example of an appearance of a game system according to one embodiment of the invention.

The invention may provide a program, an information storage medium, and a game device that can reproduce various skiing operations using a small number of operation inputs.

(1) According to one embodiment of the invention, there is provided a program that generates an image in which a moving object slides down a slope according to an inclination of a controller, the program causing a computer to function as:

an information acquisition section that acquires inclination information that indicates an inclination of the controller based on a detection result of a detection section that detects information that changes according to an inclination of the controller;

a shift angle calculation section that calculates a shift angle based on the magnitude of a velocity vector of the moving object and the inclination information, and calculates a direction of the moving object on the slope based on the shift angle and a direction of the velocity vector of the moving object;

a first force vector calculation section that calculates a first force vector in a direction intersecting at right angles on the slope with the direction of the moving object on the slope based on the inclination information;

a second force vector calculation section that calculates a second force vector based on a slope angle of the slope;

a resultant force vector calculation section that calculates a resultant force vector by combining the first force vector and the second force vector;

an update section that updates the velocity vector of the moving object based on the resultant force vector, and updates a position of the moving object based on the updated velocity vector; and an image generation section that generates an image including the moving object.

Another embodiment of the invention relates to a game device comprising the above-mentioned sections. A further embodiment of the invention relates to a computer-readable information storage medium storing a program that causes a computer to function as the above-mentioned sections.

The term "velocity vector of the moving object" used herein refers to the moving amount and the moving direction of the moving object in a virtual space per unit time.

The term "shift angle" used herein refers to an angle formed by the direction of the velocity vector of the moving object and the direction of the moving object on the slope.

The velocity vector of the moving object may be updated based on the resultant force vector by calculating a new velocity vector based on the resultant force vector and the velocity vector of the moving object before being updated, or setting the resultant force vector to be a new velocity vector of the moving object, or converting the resultant force vector based on a predetermined function to calculate a new velocity vector of the moving object.

According to the above embodiments, the shift angle that specifies a direction of the moving object with respect to a travel direction (i.e., a direction of the velocity vector of the moving object) is changed to change the direction of the first force vector in the direction perpendicular to the direction of the moving object. Since the direction of the first force vector becomes closer to the direction perpendicular to the travel direction when the shift angle is small, the first force vector includes a large amount of force component that changes the travel direction of the moving object. Since the direction of the first force vector becomes closer to the direction opposite to the travel direction when the shift angle is large, the first force vector includes a large amount of force component that decelerates the moving object. Specifically, the ratio of the force that changes the travel direction and the force that decelerates the moving object among the forces applied to the moving object can be changed by changing the shift angle.

According to the above embodiments, the ratio of the force that changes the travel direction and the force that decelerates the moving object and the magnitude of the first force vector including these forces can be controlled by one system input that tilts the controller by calculating the shift angle based on the inclination information acquired from the controller and calculating the first force vector in the direction perpendicular to the direction of the moving object based on the inclination information acquired from the controller. Moreover, the speed of the moving object can be reflected in the ratio of the force that changes the travel direction of the moving object and the force that decelerates the moving object by calculating the shift angle based on the magnitude of the velocity vector of the moving object.

(2) In each of the above-described game device, program, and information storage medium, the first force vector calculation section may calculate the first force vector based on a magnitude of the velocity vector of the moving object and the inclination information.

This enables the speed of the moving object to be reflected in the magnitude of the first force vector.

(3) In each of the above-described game device, program, and information storage medium, the information acquisition section may acquire first inclination information indicating an inclination of a first controller and second inclination information indicating an inclination of a second controller;

the shift angle calculation section may calculate the shift angle based on a magnitude of the velocity vector of the moving object, the first inclination information, and the second inclination information; and the first force vector calculation section may calculate the first force vector based on the first inclination information and the second inclination information.

This enables the ratio of the force that changes the travel direction and the force that decelerates the moving object and the magnitude of the first force vector including these forces to be controlled by one system input that tilts two controllers by calculating the shift angle and the first force vector based on the inclination information of the two controllers.

(4) In each of the above-described game, device, program, and information storage medium, the information acquisition section may acquire the first inclination information and the second inclination information each indicating a plus or minus sign depending on an inclination direction of the first or second controller; and the first force vector calculation section may calculate the first force vector based on the plus or minus sign of the first inclination information and the second inclination information.

In this embodiment, each of the first inclination information and the second inclination information indicates a plus or minus sign depending on an inclination direction of the first or second controller around an identical axis with respect to a reference direction.

The above configuration enables the first force vector to be controlled according to the combination of the inclination directions of the two controllers.

(5) Each of the above-described game device, program, and information storage medium may further cause the computer to function as:

a third force vector calculation section that calculates a third force vector that indicates air resistance applied to the moving object based on the plus or minus sign of the first inclination information and the second inclination information, wherein the resultant force vector calculation section calculates the resultant force vector by combining the second force vector and the third force vector when the third force vector has been calculated by the third force vector calculation section.

The above configuration enables the force that decelerates the moving object due to air resistance to be controlled according to the combination of the inclination directions of the two controllers.

(6) Each of the above-described game device, program, and information storage medium may further cause the computer to function as:

a fourth force vector calculation section that calculates a fourth force vector that indicates a frictional force applied to the moving object based on the plus or minus sign of the first inclination information and the second inclination information, wherein the resultant force vector calculation section calculates the resultant force vector by combining the second force vector and the fourth force vector when the fourth force vector has been calculated by the fourth force vector calculation section.

The above configuration enables the force that decelerates the moving object due to the frictional force against the slope to be controlled according to the combination of the inclination directions of the two controllers.

(7) In each of the above-described game device, program, and information storage medium, the shift angle calculation section may change the shift angle within a first angular range based on a magnitude of the velocity vector of the moving object and the inclination information when a value of the inclination information has not reached a predetermined threshold value, and change the shift angle to a predetermined angle outside the first angular range when a value of the inclination information has reached the predetermined threshold value.

This enables the shift angle to be controlled in a different manner between the case where a value of the inclination information is within a predetermined range and the case where a value of the inclination information has reached the predetermined threshold value. In particular, the moving object can be stopped by controlling the shift angle so that a force that rapidly decelerates the moving object is generated when a value of the inclination information has reached the predetermined threshold value.

(8) Each of the above-described game device, program, and information storage medium may further cause the computer to function as:

a state setting section that sets the moving object in a stationary state in which the moving object is stationary from a slide state in which the moving object moves when a magnitude of the velocity vector of the moving object has become equal to or smaller than a predetermined value.

This prevents a situation in which the moving object moves due to the slope angle of the slope or the like even if the player has stopped the moving object.

(9) In each of the above-described game device, program, and information storage medium, when the slope angle of the slope where the moving object is positioned is equal to or larger than a predetermined angle and the direction of the moving object on the slope is within a second angular range in the stationary state, the shift angle calculation section may change the direction of the moving object on the slope to a predetermined direction outside the second angular range.

The second angular range may be a predetermined angular range including the slope direction of the slope and the direction opposite to the slope direction of the slope, for example. The predetermined direction outside the second angular range may be a direction perpendicular to the slope direction of the slope, for example.

The above configuration enables the direction of the stationary moving object on the slope to be changed to a direction appropriate for the stationary state.

(10) Each of the above-described game device, program, and information storage medium may further cause the computer to function as:

a virtual camera control section that controls the position and the direction of a virtual camera, wherein the information acquisition section acquires movement information that indicates a movement of the controller based on a detection result of the detection section that detects information that changes according to a movement of the controller; and wherein the state setting section changes a state of the moving object from the stationary state to the slide state based on the direction of the virtual camera and the movement information.

This enables whether or not to set the moving object in the slide state to be determined according to the direction of the virtual camera when the moving object is set in the stationary state.

(11) In each of the above-described game device, program, and information storage medium, the information acquisition section may acquire movement information that indicates a movement of the controller based on a detection result of the detection section that detects information that changes according to a movement of the controller; and the second force vector calculation section may calculate the second force vector based on the slope angle of the slope and the movement information.

This enables the force that accelerates the moving object in the travel direction to be controlled based on the movement information acquired from the controller.

(12) Each of the above-described game device, program, and information storage medium may further cause the computer to function as:

a motion control section that controls motion of the moving object, wherein the motion control section controls the motion of the moving object based on a change in the inclination information within a predetermined period.

A change in the inclination information may be a change in inclination direction, or a change in the value of the inclination information from the maximum value to the minimum value, or a change in the value of the inclination information from the minimum value to the maximum value.

The above configuration enables the motion of the moving object to be controlled based on the inclination information acquired from the controller in addition to the force applied to the moving object. For example, the moving object may be caused to perform successive motions based on the number or the interval of changes in the inclination information within a predetermined period.

(13) Each of the above-described game device, program, and information storage medium may further cause the computer to function as:

a motion control section that controls motion of the moving object, wherein the information acquisition section acquires movement information that indicates a movement of the controller based on a detection result of the detection section that detects information that changes according to a movement of the controller; and wherein the motion control section controls the motion of the moving object that moves in a direction away from the slope based on the movement information.

This enables the jump operation of the moving object to be controlled based on the movement information acquired from the controller.

(14) Each of the above-described game device, program, and information storage medium may further cause the computer to function as:

an event generation section that generates a given event based on a position of the moving object, wherein the state setting section changes a state of the moving object from a normal state in which the moving object moves in a normal balance to a special state in which the moving object moves in a special balance based on generation of the event.

A given event may be an event in which the moving object falls, an event in which the moving object comes in contact with an obstacle on the slope or another moving object, or an event in which an impact is applied to the moving object when landing, for example.

The normal state may be a state in which the first force vector is calculated based on the inclination information, and the special state may be a state in which the first force vector is not calculated based on the inclination information, for example.

The above configuration enables movement or motion of the moving object to be controlled based on generation of the event.

Embodiments of the invention are described below. Note that the embodiments described below do not in any way limit the scope of the invention defined in the claims herein. In addition, not all of the elements of the embodiments described below should be taken as essential requirements of the invention.

1. Outline of System

FIG. 1 is a schematic external view showing a game system 10 according to one embodiment of the invention. The game system 10 according to this embodiment includes a display section 12 that displays a game image on a display screen 11, a game device 14 that performs a game process and the like, a first controller 16, and a second controller 18, the first controller 16 and the second controller 18 being held by a player P with either hand so that their positions and directions within a predetermined range can be arbitrarily changed. Each of the first controller 16 and the second controller 18 according to this embodiment includes a detection section that detects information which changes based on the inclination and the movement of each controller so that information relating to the inclination and the movement of each controller can be acquired. In the example shown in FIG. 1, the game device 14 and the first controller 16 exchange information via wireless communication. The first controller 16 and the second controller 18 are connected via a cable.

In this embodiment, each of the first controller 16 and the second controller 18 includes a triaxial acceleration sensor (detection section). The acceleration sensor detects the direction and the degree of inclination of the controller as acceleration vectors (inclination information) in three axial directions applied to the controller. The acceleration sensor detects the movement of the controller (i.e., changes in speed and direction of the controller per unit time due to the movement of the controller) as acceleration vectors (movement information) in three axial directions applied to the controller.

As shown in FIG. 1, when the player P has moved the first controller 16 and the second controller 18 while holding each controller to change the inclination and the movement of each controller, a moving object MO displayed on the display screen 11 can be controlled based on the information that changes based on the inclination and the movement of each controller. Specifically, the moving object MO can be operated based on the inclination and the movement of the controller 16.

In this embodiment, the moving object MO that skis down a slope is displayed on the display screen 11. The moving object MO moves on a map MP that indicates the slope at a speed corresponding to the slope angle set on the map MP. In this embodiment, the moving direction, the speed, or the operation of the moving object MO on the map MP is changed by tilting or shaking each controller in a predetermined direction.

2. Method According to this Embodiment

A method according to this embodiment is described below with reference to the drawings.

FIGS. 2 to 17 are diagrams for describing operations of the controllers and control of the moving object according to this embodiment.

Figure 2:
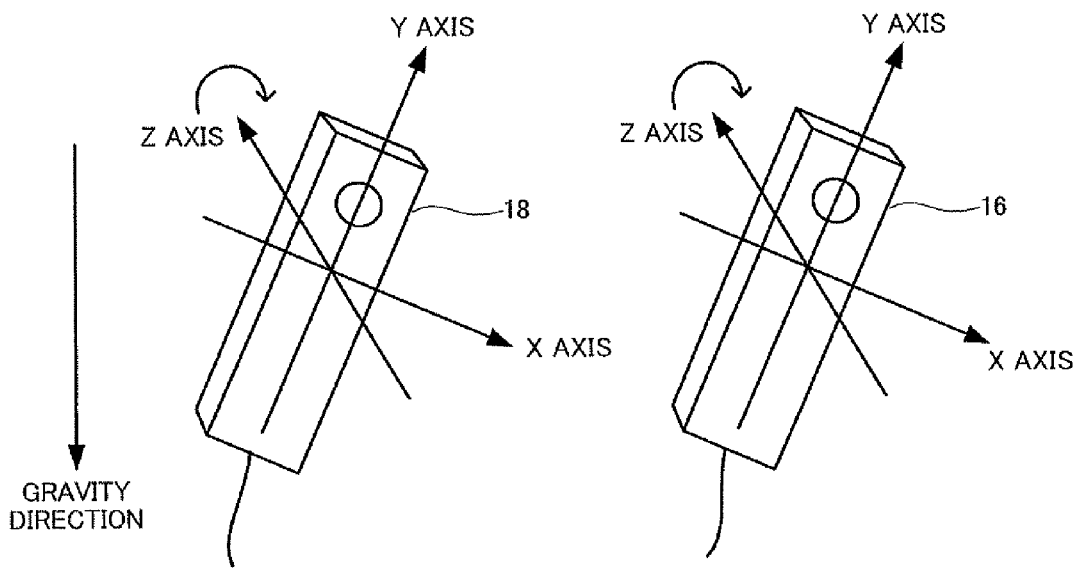
FIG. 2 is a diagram for describing a method according to one embodiment of the invention.

FIG. 2 is a view illustrative of an example of the operation of tilting the two controllers in the same direction. In the example shown in FIG. 2, the first controller 16 and the second controller 18 are tilted clockwise around the Z axis. When such an operation has been performed, an acceleration occurs in the +X-axis direction due to gravity so that acceleration information with a plus sign corresponding to the inclination is output from an X axis output of the acceleration sensor provided in each controller. When the first controller 16 and the second controller 18 have been tilted counterclockwise around the Z axis, differing from the example shown in FIG. 2, an acceleration occurs in the −X-axis direction due to gravity so that the acceleration information with a minus sign corresponding to the inclination is output from the X axis output of each acceleration sensor. The absolute value of the acceleration information from the X axis output of each acceleration sensor becomes a maximum when each controller is tilted by 90° around the Z axis.

Figure 3:
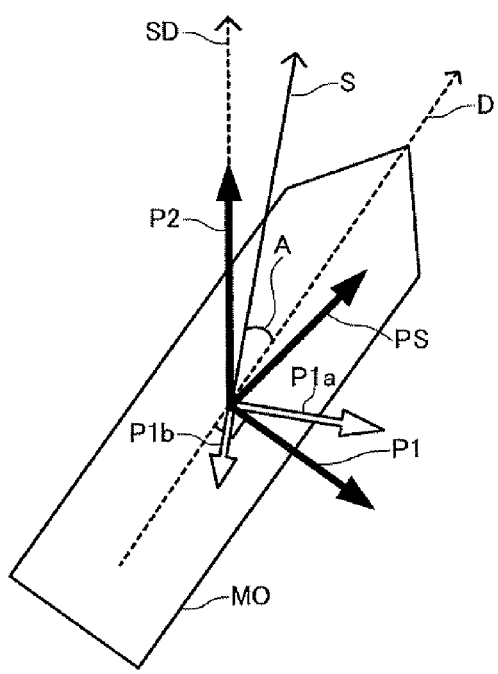
FIG. 3 is a diagram for describing a method according to one embodiment of the invention.

FIG. 3 is a diagram for describing an example of control of the moving object when the operation shown in HG 2 is performed. In this embodiment, when the acceleration information with a plus sign has been acquired from the X axis output of the acceleration sensor of each controller, the moving object MO that skis down the slope is caused to make a right turn. Note that the moving object MO is illustrated as a ski for convenience.

In this embodiment, when the acceleration information with a plus sign has been acquired from the X axis output of the acceleration sensor of each controller, a shift angle A that specifies the direction D of the moving object on the slope with respect to the travel direction (direction of velocity vector S) of the moving object MO is calculated. The shift angle A is calculated based on the value of the acceleration information from the acceleration sensor of each controller (the average or the sum of the acceleration information from each acceleration sensor) and the magnitude of the current velocity vector S of the moving object MO. The maximum value of the shift angle A is determined by the magnitude of the velocity vector S of the moving object MO (the speed of the moving object). The calculated shift angle A increases within a range that does not exceed the maximum value as the value of the acceleration information from the acceleration sensor of each controller increases.

Figure 4:
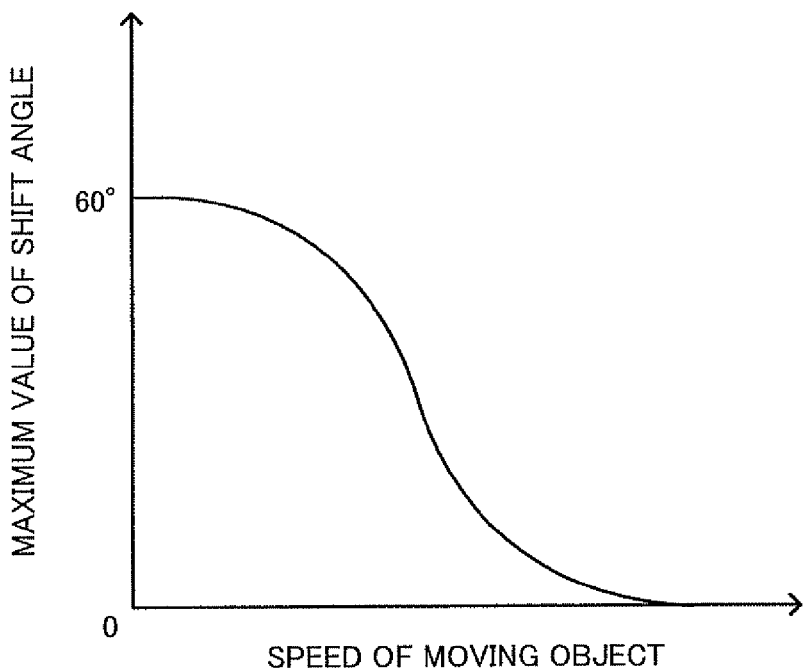
FIG. 4 is a graph for describing a method according to one embodiment of the invention.

FIG. 4 is a graph illustrative of the relationship between the speed of the moving object and the maximum value of the shift angle. In this embodiment, the maximum value of the shift angle A is reduced as the speed of the moving object MO increases. The shift angle A is set at 0° when the speed of the moving object MO is equal to or higher than a predetermined speed. Therefore, when the speed of the moving object MO is low, an identical shift angle A can be obtained by tilting each controller to a smaller extent as compared with the case where the speed of the moving object MO is high. In this embodiment, the maximum value of the shift angle A is at a value equal to or smaller than 60°.

The direction D of the moving object is then specified by the calculated shift angle A, and a first force vector P1 in the direction intersecting at right angles on the slope with the direction D of the moving object is calculated. The first force vector P1 is calculated based on the acceleration information from the acceleration sensor of each controller and the magnitude of the current velocity vector S of the moving object MO. The maximum value of the first force vector P1 is determined by the magnitude of the velocity vector S of the moving object MO (speed of the moving object). The calculated first force vector P1 increases within a range that does not exceed the maximum value as the value of the acceleration information increases.

Figure 5:
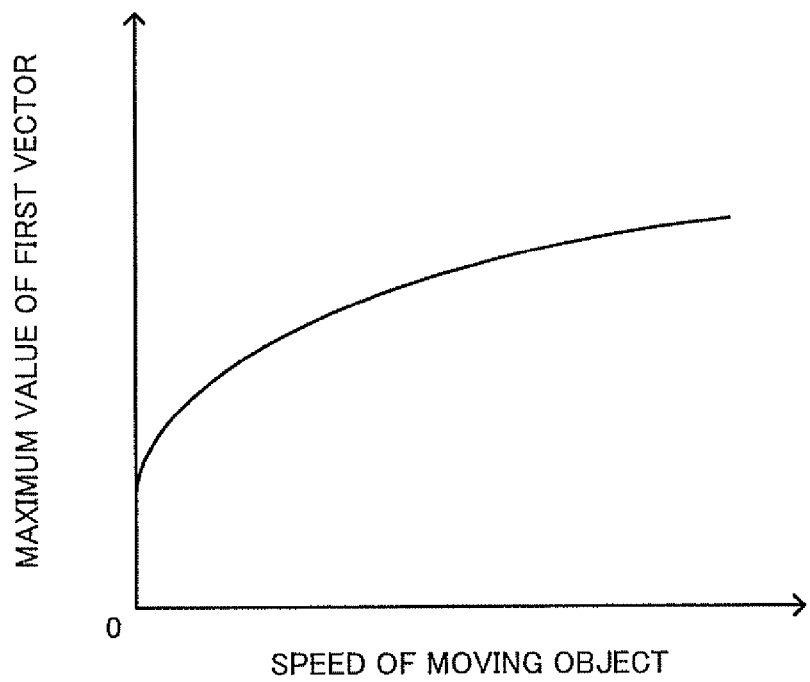
FIG. 5 is a graph for describing a method according to one embodiment of the invention.

FIG. 5 is a graph illustrative of the relationship between the speed of the moving object and the maximum value of the first force vector P1. As shown in FIG. 5, the maximum value of the first force vector P1 increases as the speed of the moving object MO increases. Therefore when the speed of the moving object MO is high, the first force vector P1 having an identical magnitude can be obtained by tilting each controller to a smaller extent as compared with the case where the speed of the moving object MO is low.

As shown in FIG. 3, the first force vector P1 can be decomposed into a component (force component that changes the travel direction of the moving object MO) P1a in the direction perpendicular to the direction of the velocity vector S, and a component P1b (force component that decelerates the moving object MO) in the direction opposite to the direction of the velocity vector S. Since the direction of the first force vector P1 becomes closer to the direction perpendicular to the direction of the velocity vector S as the shift angle A decreases, the component P1a of the first force vector P1 increases while the component P1b decreases. Since the direction of the first force vector P1 becomes closer to the direction opposite to the travel direction as the shift angle A increases, the component P1a of the first force vector P1 decreases while the component P1b increases. In this embodiment, the ratio of the force that changes the travel direction and the force that decelerates the moving object among the forces applied to the moving object MO can be changed by changing the shift angle A.

Figure 6:
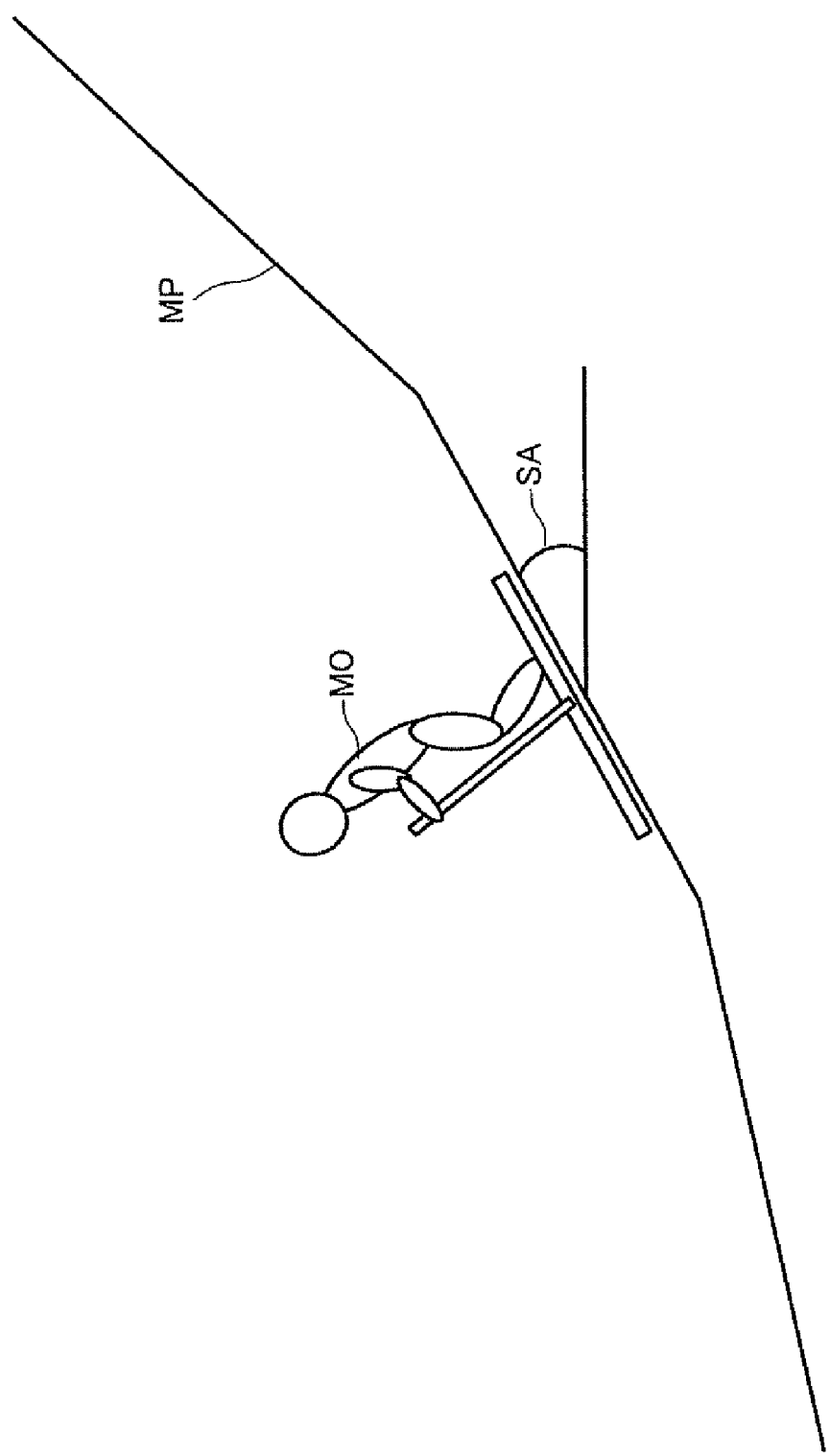
FIG. 6 is a diagram for describing a method according to one embodiment of the invention.

A second force vector P2 that accelerates the moving object MO in the slope direction is then calculated. The direction of the second force vector P2 is the same as the slope direction SD (direction in which the slope angle becomes a maximum) of the slope. The magnitude of the second force vector P2 is calculated based on the slope angle SA at a point on the map MP (slope) where the moving object MO is positioned, as shown in FIG. 6. The second force vector P2 increases as the slope angle SA increases.

As shown in FIG. 3, a resultant force vector PS is calculated by combining the first force vector P1 and the second force vector P2 thus calculated. In the example shown in FIG. 3, the resultant force vector PS serves as a force that causes the moving object MO to make a right turn. Note that the resultant force vector PS may be calculated by combining a third force vector that indicates the air resistance applied to the moving object MO and a fourth force vector that indicates the friction force applied to the moving object MO in addition to the first force vector P1 and the second force vector P2. A new velocity vector S' of the moving object MO is calculated based on the resultant force vector PS thus calculated and the velocity vector S, and the position of the moving object MO is updated based on the new velocity vector S'.

Figure 7:
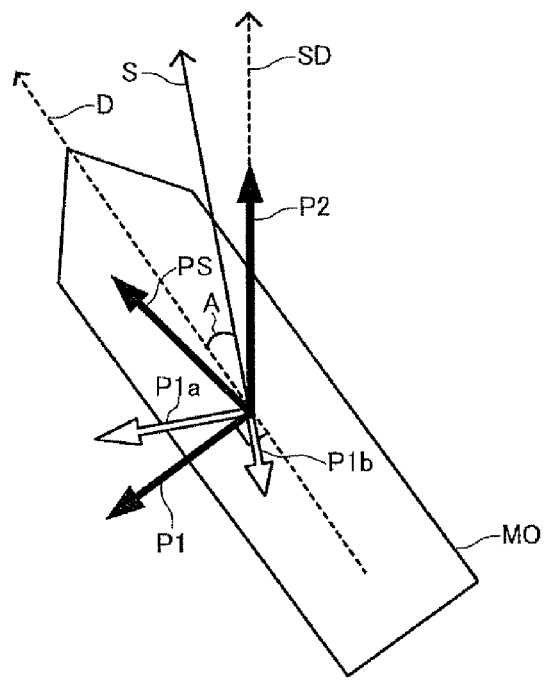
FIG. 7 is a diagram for describing a method according to one embodiment of the invention.

FIG. 7 is a diagram for describing an example of control of the moving object when the first controller 16 and the second controller 18 are tilted counterclockwise around a Z axis, differing from the example shown in FIG. 2. In this embodiment, when the acceleration information with a minus sign has been acquired from the X axis output of the acceleration sensor of each controller, the shift angle A by which the direction D of the moving object on the slope is shifted to the left with respect to the travel direction (direction of velocity vector S) of the moving object MO is calculated, differing from the example shown in FIG. 3. The maximum value of the shift angle A is determined by the magnitude of the velocity vector S of the moving object MO (the speed of the moving object). The calculated shift angle A increases within a range that does not exceed the maximum value as the value of the acceleration information from the acceleration sensor of each controller (the average or the sum of the acceleration information from each acceleration sensor) increases.

The first force vector P1 in the direction intersecting at right angles on the slope with the direction D of the moving object is calculated. The maximum value of the first force vector P1 is determined by the magnitude of the velocity vector S of the moving object MO (the speed of the moving object). The calculated first force vector P1 increases within a range that does not exceed the maximum value as the value of the acceleration information from the acceleration sensor of each controller increases. The resultant force vector PS is then calculated in the same manner as in the example shown in FIG. 3. In the example shown in FIG. 7, the resultant force vector PS serves as a force that causes the moving object MO to make a left turn. In this embodiment, the turning direction of the moving object can be changed by changing the tilt direction of each controller.

Figure 8:
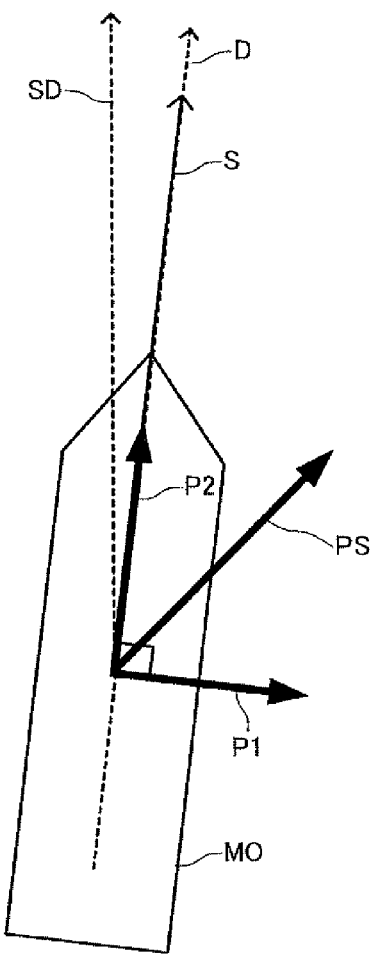
FIG. 8 is a diagram for describing a method according to one embodiment of the invention.

FIG. 8 is a diagram for describing an example of control of the moving object when the speed of the moving object is equal to or higher than a predetermined speed. In this embodiment, the maximum value of the shift angle A is set at 0 when the speed of the moving object is equal to or higher than a predetermined speed, as shown in FIG. 4. Therefore, even if the first controller 16 and the second controller 18 are tilted counterclockwise around a Z axis, as shown in FIG. 8, the shift angle A becomes 0 when the magnitude of the velocity vector S of the moving object is equal to or larger than a predetermined value. Therefore, the direction D of the moving object is the same as the direction of the velocity vector S. Accordingly, the direction of the first force vector P1 is perpendicular to the direction of the velocity vector S of the moving object so that the first force vector P1 includes only the component P1a that changes the travel direction of the moving object MO due to a turn, but does not include the component P1*b* that decelerates the moving object due to a turn. Therefore, the resultant force vector PS shown in FIG. 8 serves as a force that causes the moving object MO to make a right turn without decelerating the moving object MO due to a turn, differing from the resultant force vector PS shown in FIG. 3.

In this embodiment, since the shift angle A is set at 0 when the speed of the moving object MO is equal to or higher than a predetermined speed, a turn can be switched between a turn (drift turn) accompanied by deceleration due to the turn and a turn (curving turn) which is not accompanied by deceleration due to the turn according to the speed of the moving object MO. Specifically, since the setting value of the shift angle based on the inclination of each controller is changed based on the speed of the moving object MO, it is possible to cause the moving object to make a drift turn and a curving turn by one system input that tilts each controller.

Figure 9:
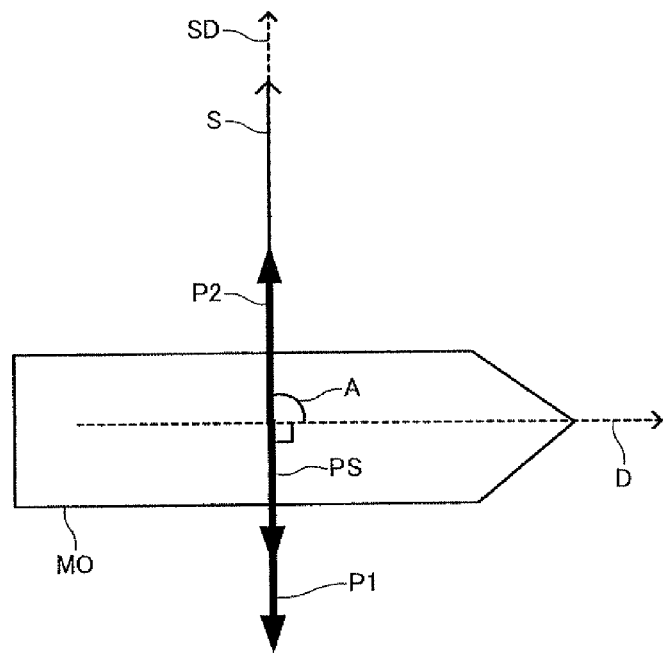
FIG. 9 is a diagram for describing a method according to one embodiment of the invention.

FIG. 9 is a diagram for describing an example of control of the moving object when the value of the acceleration information from the acceleration sensor of each controller has reached a predetermined threshold value. In this embodiment, when the absolute value of the average or the sum of the acceleration information from the acceleration sensor of each controller has not reached a predetermined threshold value, the shift angle A is calculated within the range (first angular range) from 0° to 60° based on the acceleration information and the speed of the moving object. On the other hand, when the absolute value of the average or the sum of the acceleration information from each acceleration sensor has reached a predetermined threshold value, the shift angle A is set at 90°, as shown in FIG. 9. Therefore, the direction D of the moving object is perpendicular to the direction of the velocity vector S of the moving object, and the direction of the first force vector P1 is opposite to the direction of the velocity vector S. Specifically, the first force vector P1 includes only the component P1*b* that decelerates the moving object MO. Since the direction of the resultant force vector PS obtained by combining the first force vector P1 and the second force vector P2 is opposite to the direction of the velocity vector S when the first force vector P1 is larger than the second force vector P2 (see FIG. 9), the moving object MO can be decelerated.

In this embodiment, the moving object MO can be caused to make a right turn or a left turn when each controller has been tilted around the Z axis within such a range that the value of the acceleration information from the acceleration sensor of each controller does not reach the first threshold value, and the moving object MO can be braked (due to a turn) when each controller has been tilted around the Z axis so that the first threshold value is reached.

Figure 10:
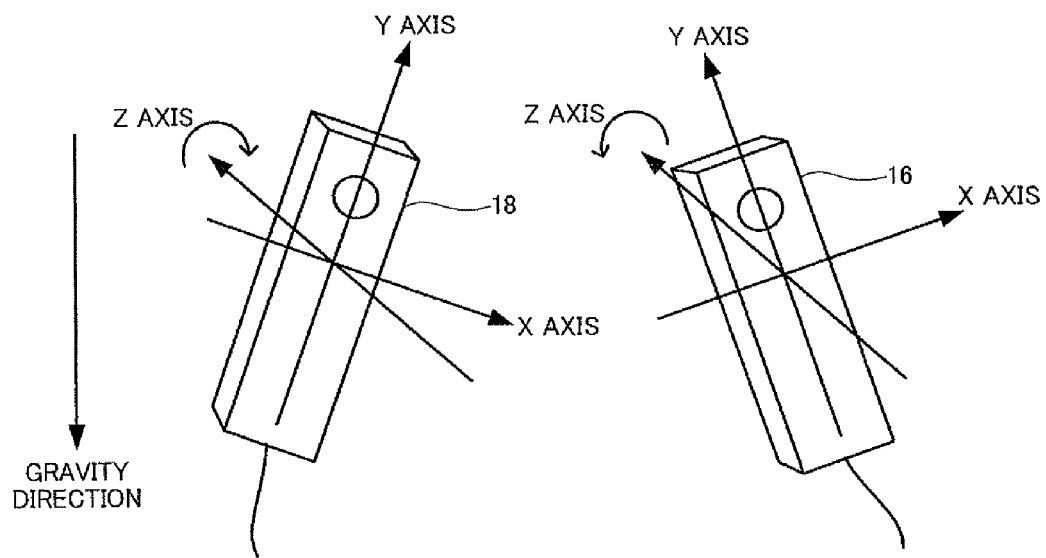
FIG. 10 is a diagram for describing a method according to one embodiment of the invention.

FIG. 10 is a diagram for describing an example of the operation of tilting the two controllers in different directions. In the example shown in FIG. 10, the first controller 16 is tilted counterclockwise around the Z axis, and the second controller 18 is tilted clockwise around the Z axis. When such an operation has been performed, the first controller is accelerated in the −X-axis direction due to gravity so that the acceleration information with a minus sign is output from the X axis output of the acceleration sensor provided in the first controller, and the second controller is accelerated in the +X-axis direction due to gravity so that the acceleration information with a plus sign is output from the X axis output of the acceleration sensor provided in the second controller.

Figure 11:
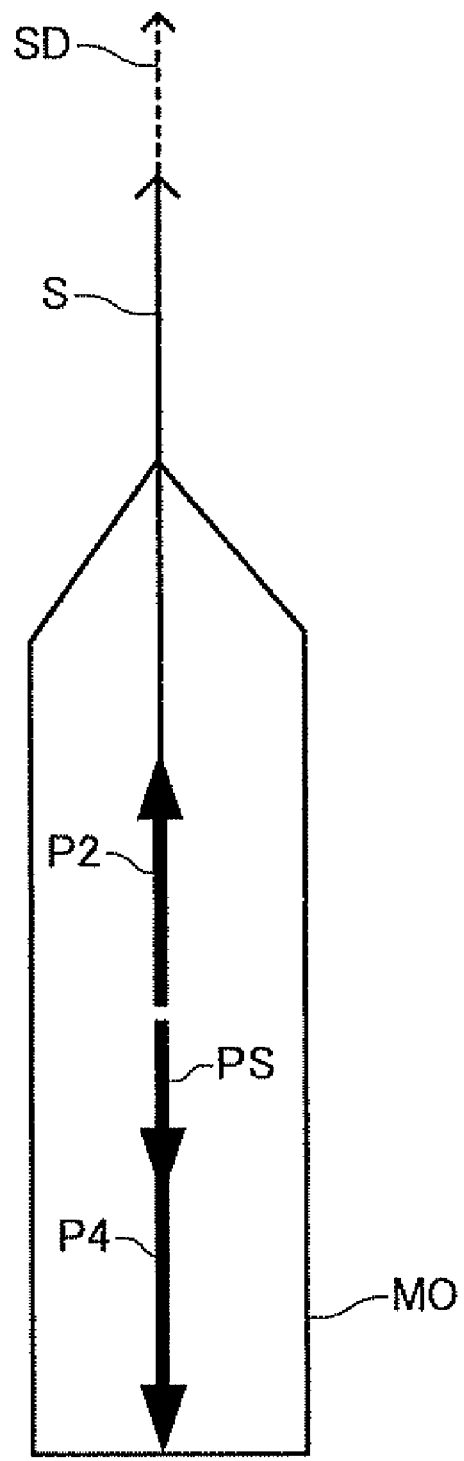
FIG. 11 is a diagram for describing a method according to one embodiment of the invention.

FIG. 11 is a diagram for describing an example of control of the moving object when the operation shown in FIG. 10 is performed. In this embodiment, when the acceleration information with a minus sign has been acquired from the X axis output of the acceleration sensor of the first controller and the acceleration information with a plus sign has been acquired from the X axis output of the acceleration sensor of the second controller, the moving object is decelerated (deceleration due to snowplow). In this case, the magnitude of the fourth force vector P4 that indicates the frictional force applied to the moving object MO due to the slope is increased. Since the direction of the resultant force vector PS obtained by combining the fourth force vector P4 and the second force vector P2 is opposite to the direction of the velocity vector S when the fourth force vector P4 is larger than the second force vector P2, the moving object MO can be decelerated. The fourth force vector P4 may be increased by a predetermined amount, or the amount by which the fourth force vector P4 is increased may be calculated based on the difference between the acceleration information from the acceleration sensor of each controller.

According to this embodiment, the player can perform the operation shown in FIG. 10 by moving the right hand holding the first controller 16 counterclockwise and moving the left hand holding the second controller 18 clockwise so that the moving object can be decelerated due to the snowplow operation as if to snowplow with both skis.

Figure 12:
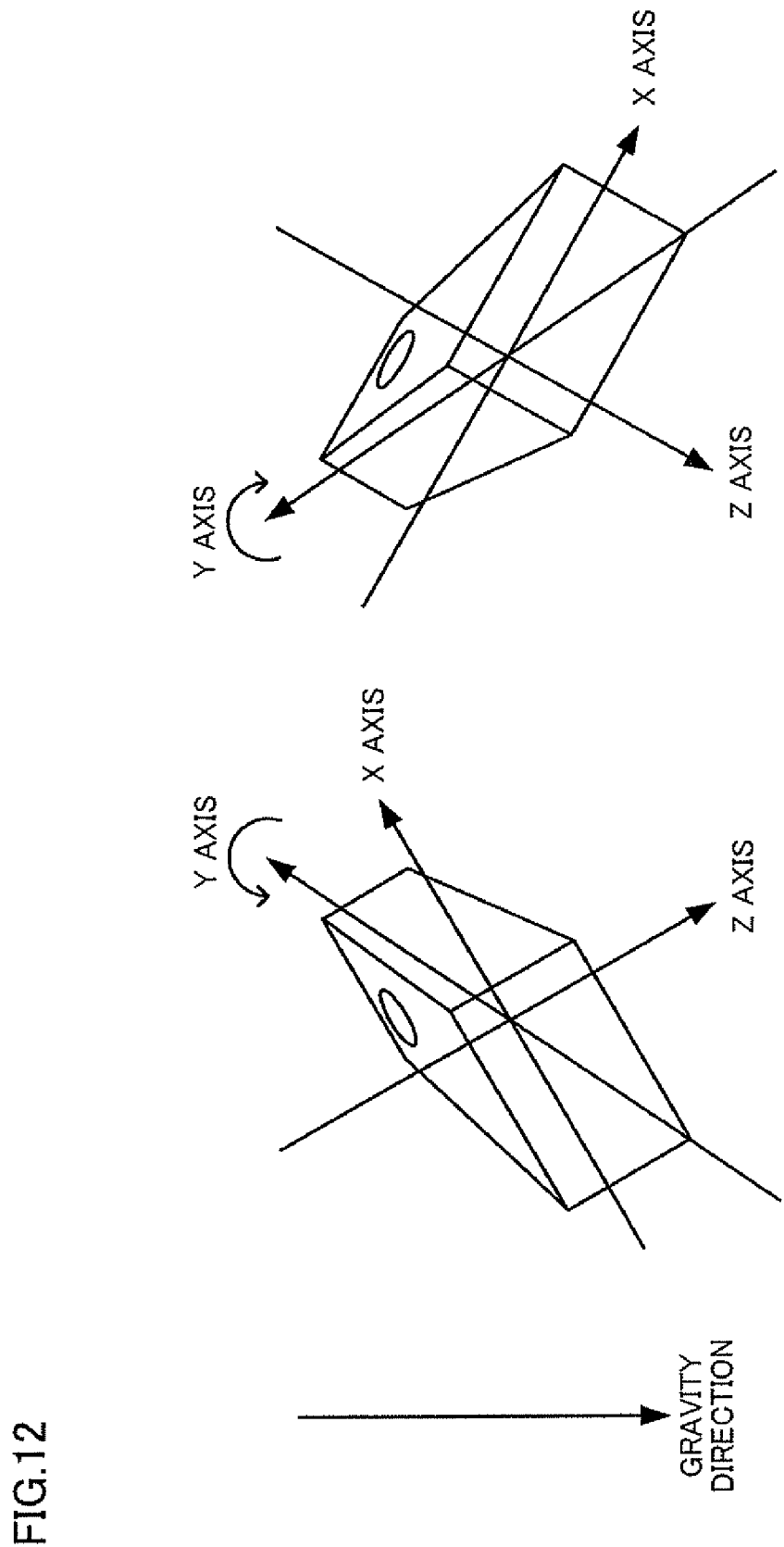
FIG. 12 is a diagram for describing a method according to one embodiment of the invention.

FIG. 12 is a diagram for describing an example of the operation of tilting the two controllers in different directions. In the example shown in FIG. 12, the first controller 16 is tilted clockwise around the Y axis, and the second controller 18 is tilted counterclockwise around the Y axis in a state in which each controller is held horizontally (i.e., the Y axis is maintained in the horizontal direction). When such an operation has been performed, the first controller is accelerated in the +X-axis direction due to gravity so that the acceleration information with a plus sign is output from the X axis output of the acceleration sensor provided in the first controller, and the second controller is accelerated in the X-axis direction due to gravity so that the acceleration information with a minus sign is output from the X axis output of the acceleration sensor provided in the second controller. Note that the acceleration information similar to that of the example shown in FIG. 12 can also be obtained by tilting the first controller 16 clockwise around the Z axis and tilting the second controller 18 clockwise around the Z axis in FIG. 10.

Figure 13:
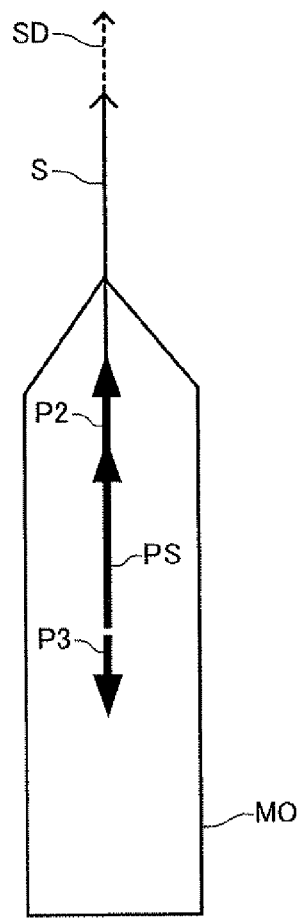
FIG. 13 is a diagram for describing a method according to one embodiment of the invention.

FIG. 13 is a diagram for describing an example of control of the moving object when the operation shown in FIG. 12 is performed. In this embodiment, when the acceleration information with a plus sign has been acquired from the X axis output of the acceleration sensor of the first controller and the acceleration information with a minus sign has been acquired from the X axis output of the acceleration sensor of the second controller, the moving object is accelerated (acceleration due to a crouching position). In this case, the magnitude of the third force vector P3 that indicates the air resistance applied to the moving object MO is decreased. Since the magnitude of the resultant force vector PS obtained by combining the third force vector P3 and the second force vector P2 increases as the third force vector P3 decreases, the moving object MO can be accelerated. The third force vector P3 may be decreased by a predetermined amount, or the amount by which the third force vector P3 is decreased may be calculated based on the difference between the acceleration information from the acceleration sensor of each controller.

According to this embodiment, the player can perform the operation shown in FIG. 12 by moving the right hand holding the first controller 16 clockwise and moving the left hand holding the second controller 18 counterclockwise so that the moving object can be accelerated due to a crouching position as if to crouch (bend forward) while holding the poles in his arms.

Figure 14:
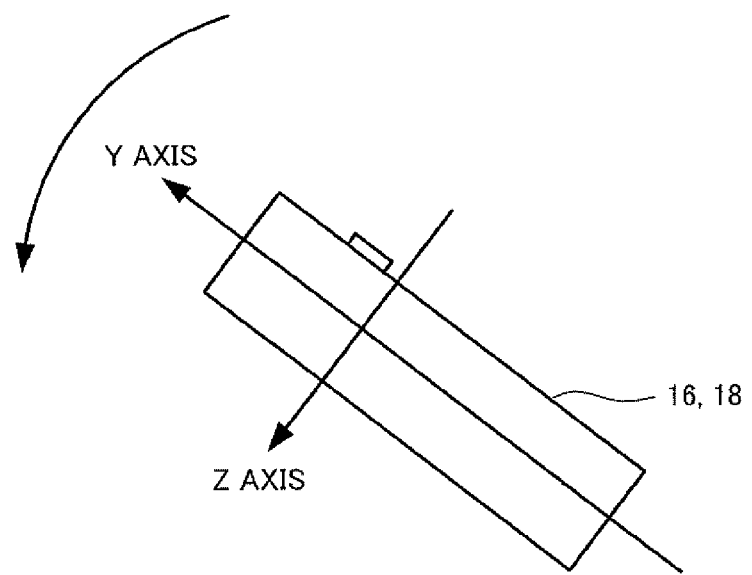
FIG. 14 is a diagram for describing a method according to one embodiment of the invention.

FIG. 14 is a diagram for describing an example of the operation of shaking (moving) the two controllers. In the example shown in FIG. 14, the first controller 16 and the second controller 18 are moved in the +Z axis direction. When such an operation has been performed, an acceleration occurs in the +Z-axis direction due to the movement of the controller so that the acceleration information with a plus sign corresponding to the movement is output from a Z axis output of the acceleration sensor provided in each controller. When the first controller 16 and the second controller 18 are moved in the −Z axis direction, differing from the example shown in FIG. 14, an acceleration occurs in the −Z-axis direction due to the movement of the controller so that the acceleration information with a minus sign corresponding to the movement is output from the Z axis output of the acceleration sensor provided in each controller.

In this embodiment, when the acceleration information with a plus sign has been acquired from the Z axis output of the acceleration sensor of each controller and the value of the acquired acceleration information (the average or the sum of the acceleration information from each acceleration sensor) has exceeded a predetermined threshold value (i.e., each controller has been shaken in the +Z axis direction to a predetermined degree), the moving object is accelerated (acceleration due to skating). In this case, the magnitude of the second force vector P2 calculated based on the slope angle SA of the slope is increased. Therefore, a force equal to or larger than the force applied due to the slope angle SA can be applied to the moving object MO. The magnitude of the second force vector P2 may be calculated by adding a predetermined value to the second force vector P2 calculated based on the slope angle SA of the slope, or the amount by which of the magnitude of the second force vector P2 is increased may be calculated based on the average or the sum of the acceleration information from each acceleration sensor.

In this embodiment, when the acceleration information with a minus sign has been acquired from the Z axis output of the acceleration sensor of each controller and the value of the acquired acceleration information (the average or the sum of the acceleration information from each acceleration sensor) has exceeded a predetermined threshold value (i.e., each controller has been shaken in the −z axis direction to a predetermined degree), the moving object is moved in the direction away from the slope (i.e., the moving object MO jumps).

In this embodiment, an event in which the moving object comes in contact with an obstacle on the slope or another moving object, an event in which an impact is applied to the moving object MO when landing, or the like is generated based on the position of the moving object MO, and the moving object MO is set in a special state (staggering state or falling state) in which the moving object MO is moved in a special balance from a normal state in which the moving object MO is moved in a normal balance based on generation of the event. In this embodiment, when the acceleration information with a minus sign has been acquired from the Z axis output of the acceleration sensor of each controller when the moving object MO is set in the special state and the value of the acquired acceleration information (the average or the sum of the acceleration information from each acceleration sensor) has exceeded a predetermined threshold value (i.e., each controller has been shaken in the −Z axis direction to a predetermined degree), the moving object is set in the normal state.

Figure 15:
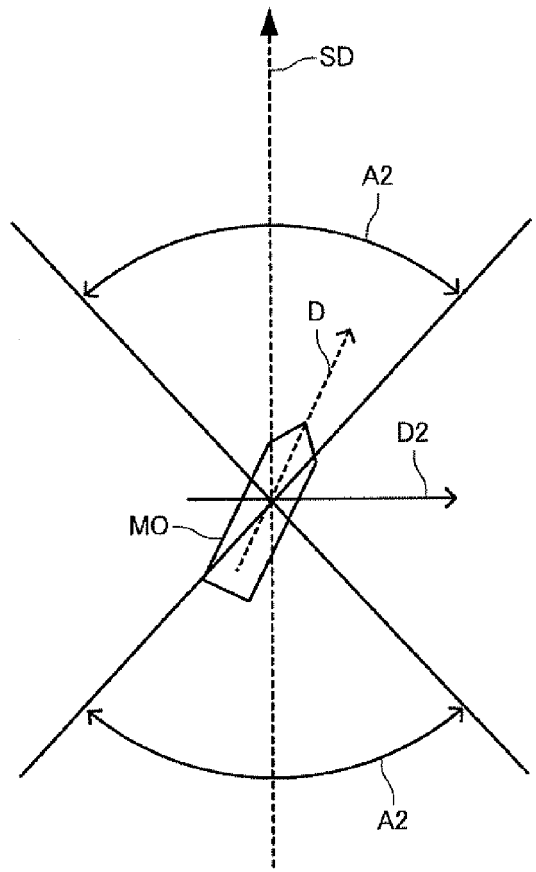
FIG. 15 is a diagram for describing a method according to one embodiment of the invention.

FIG. 15 is a diagram for describing an example of direction control of the moving object set in a stationary state. In this embodiment, when the magnitude of the velocity vector S of the moving object MO (the speed of the moving object MO) has become equal to or smaller than a predetermined value, the moving object MO is set in a stationary state in which the moving object MO is not moved. In this case, when the slope angle SA at a point where the moving object MO set in the stationary state is positioned is equal to or larger than a predetermined angle and the direction D of the moving object on the slope is within a second angular range, the direction D of the moving object is changed to a predetermined direction. In the example shown in HG 15, the second angular range A2 is set to be a range including the slope direction SD of the slope (direction in which the moving object moves forward) and the direction opposite to the slope direction SD (direction in which the moving object moves backward). In the example shown in FIG. 15, since the direction D of the moving object set in the stationary state is within the second angular range A2, the direction D of the moving object is changed to a direction (predetermined direction) D2 perpendicular to the slope direction SD. This prevents a situation in which the moving object MO is positioned in the slope direction SD in which the moving object moves forward or is positioned in the direction opposite to the slope direction SD even if the moving object MO is set in the stationary state.

Figure 16:
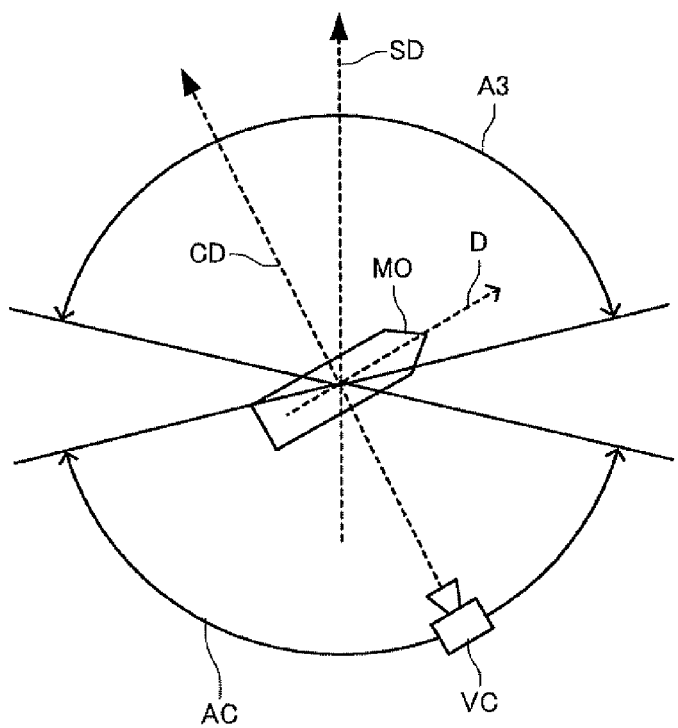
FIG. 16 is a diagram for describing a method according to one embodiment of the invention.

FIG. 16 is a diagram for describing an example in which the state of the moving object set in the stationary state is changed. In this embodiment, when the moving object is set in the stationary state, the position of a virtual camera is controlled so that the virtual camera moves along a circle around the moving object MO based on operation data from the controller. The direction of the virtual camera is controlled so that the virtual camera always faces the moving object MO even if the virtual camera moves along the circle around the moving object MO. Therefore, the player can check the state around the stationary moving object MO by operating the controller to move the virtual camera.

In this embodiment, when the acceleration information with a plus sign has been acquired from the Z axis output of the acceleration sensor of each controller when the moving object MO is set in the stationary state, the value of the acquired acceleration information (the average or the sum of the acceleration information from each acceleration sensor) has reached a predetermined threshold value (i.e., each controller has been shaken in the +Z axis direction to a predetermined degree), and the direction CD of the virtual camera is within a third angular range A3 (i.e., the virtual camera VC is positioned on an arc AC), the moving object MO is set in a travel (sliding) state. In the example shown in FIG. 16, the third angular range A3 is set to be a range including the slope direction SD of the slope. In the example shown in FIG. 16, since the direction CD of the virtual camera is within the third angular range A3, the moving object MO is set in the slide state when the value of the acceleration information acquired from the Z axis output of the acceleration sensor of each controller has reached a predetermined threshold value, and the direction D of the moving object is changed to the direction CD of the virtual camera so that the moving object MO is moved in the direction CD of the virtual camera. In this embodiment, the moving object MO is not set in the slide state when the direction CD of the virtual camera is not within the third angular range A3 (i.e., the virtual camera VC is not positioned on the arc AC). Since the moving object MO is moved in the direction CD of the virtual camera only when the direction VC of the virtual camera is within the angular range including the slope direction, a situation in which the moving object MO moves in the horizontal direction with respect to the slope direction SD or the direction opposite to the slope direction SD can be prevented. Moreover, the player can check the state in the travel direction of the moving object MO.

The moving object MO may be set in the slide state when the direction D of the moving object is within the third angular range AC. In the example shown in FIG. 16, since the direction D of the moving object set in the stationary state is within the third angular range A3, the moving object MO is set in the slide state when the value of the acceleration information acquired from the Z axis output of the acceleration sensor of each controller has reached a predetermined threshold value. This prevents a situation in which the moving object MO that faces in the horizontal direction with respect to the slope direction SD or the direction opposite to the slope direction SD moves downward.

Figure 17:
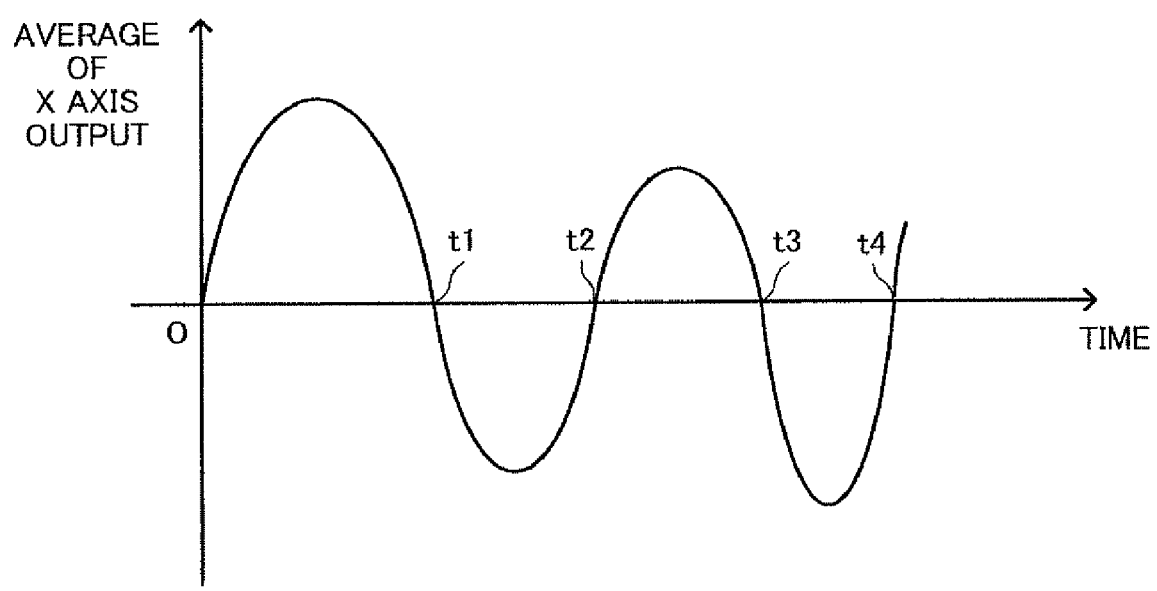
FIG. 17 is a graph for describing a method according to one embodiment of the invention.

FIG. 17 is a graph illustrative of an example in which the operation of the moving object MO is controlled based on a change in the acceleration information (inclination information) acquired from the X axis output of the acceleration sensor of each controller within a predetermined period of time. FIG. 17 shows the average of the X-axis acceleration information that changes with the passage of time. The sign of the average of the X-axis acceleration information changes from plus to minus (i.e., the operation changes from the right turn operation to the left turn operation) at times t1 and t3, and the sign of the average of the X-axis acceleration information changes from minus to plus (i.e., the operation changes from the left turn operation to the right turn operation) at times t2 and t4. In this embodiment, when it has been determined that a change in the sign of the average of the X-axis acceleration information has occurred successively within a predetermined period of time, the operation of the moving object MO is changed from a parallel turn (i.e., a right turn and a left turn occur intermittently) to a wedeln (i.e., a right turn and a left turn occur successively).

Figure 21:
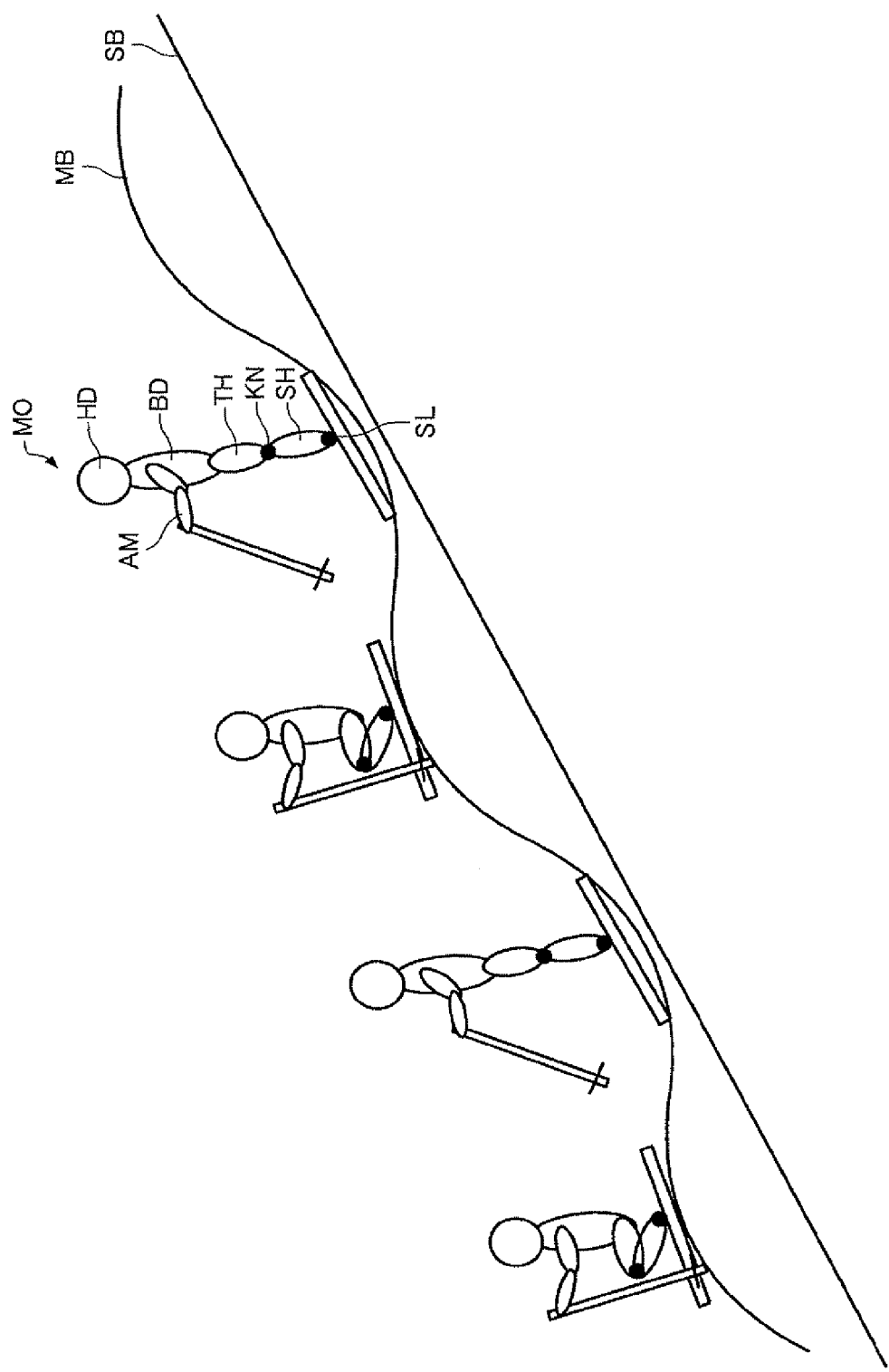
FIG. 21 is a diagram for describing a method according to one embodiment of the invention.

FIG. 21 is a diagram for describing an example of control of the operation of the moving object when the map MP that indicates the slope involves elevations or depressions. In this embodiment, a mogul course MB in which elevations or depressions are provided on the map MP is provided, as shown in HG 21. When the moving object MO moves in the mogul course MB, the movement of the moving object MO is controlled so that the moving object MO performs a mogul operation in which the moving object MO bends and stretches knees KN according to the elevations or depressions of the mogul course MB while maintaining a body trunk BD at a predetermined angle. In this embodiment, a reference slope SB without elevations or depressions according to the slope of the mogul course MB is disposed on the map MP corresponding to the mogul course MB. When the moving object MO moves in the mogul course MB, the positions of a head HD and the body trunk BD of the moving object MO are determined so that the head HD moves parallel to the reference slope SB. On the other hand, the rotational angle of the joint of the knee KN is determined so that a sole SL moves parallel to the elevations or depressions of the mogul course MB to determine the positions of a thigh TH and a leg (shank) SH. The moving object MO uses a pole with either arm AM each time the moving object MO bends the knee KN by a predetermined angle when positioned on the elevation. The load (repulsive force of the bent knee KN) applied to the mogul course MB due to the moving object MO may be determined based on the rotational angle of the joint of the knee KN, and the process may be controlled so that the first force vector P1 increases as the load increases. Therefore, the magnitude of the force that causes the moving object MO to make a turn can be controlled according to the elevations or depressions of the slope on which the moving object MO moves.

3. Configuration

Figure 18:
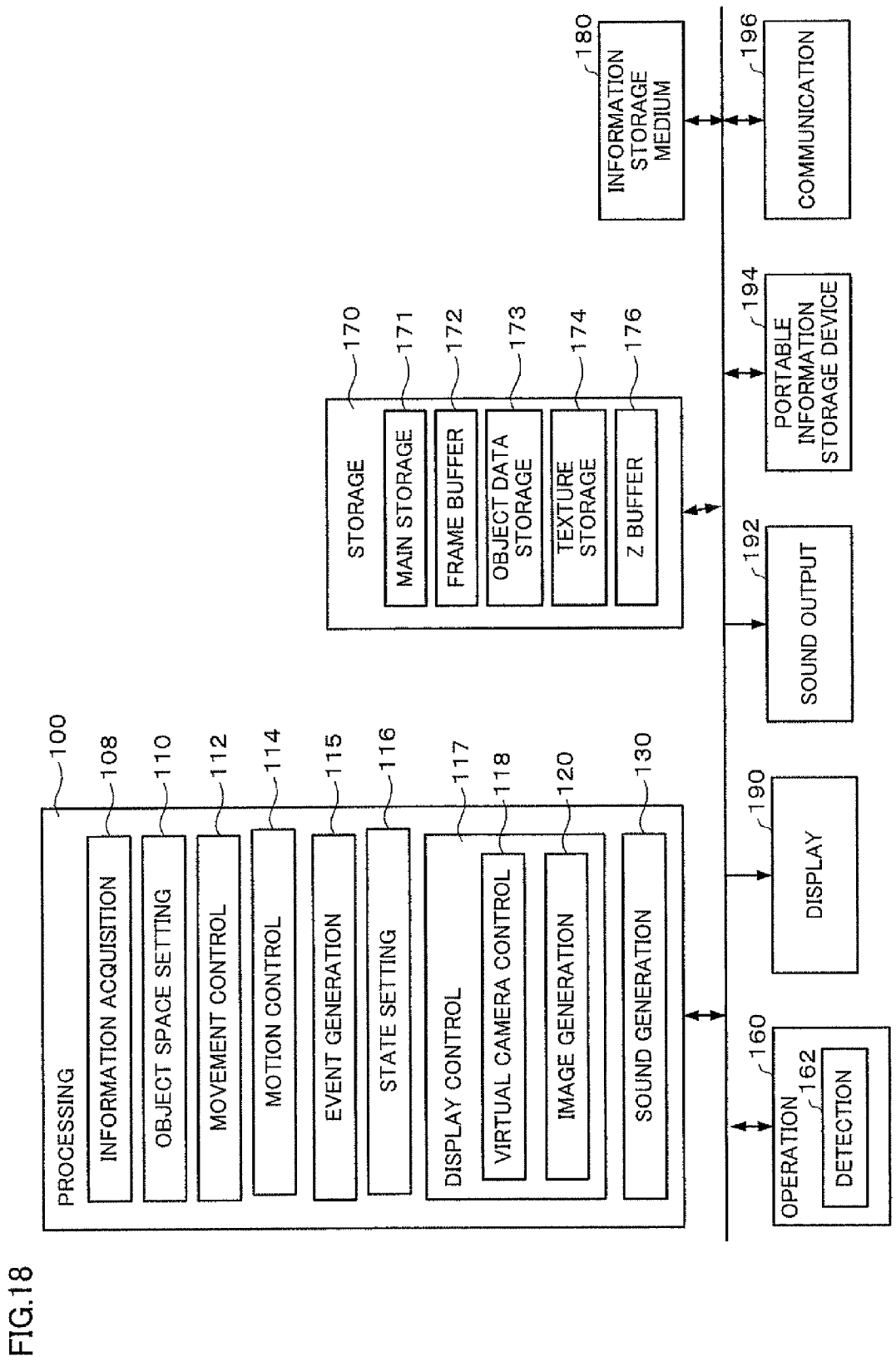
FIG. 18 is a diagram showing an example of functional blocks according to one embodiment of the invention.

The configuration of the game system according to this embodiment is described below with reference to FIG. 18. FIG. 18 shows an example of a functional block diagram of the game system according to this embodiment. Note that the game system according to this embodiment may have a configuration in which some of the elements (sections) shown in FIG. 18 are omitted.

An operating section 160 allows the player to input operation data. In this embodiment, the player holds the operation section 160 and can arbitrarily change the position and the direction of the operation section 160. The operation section 160 includes a detection section 162 that detects information which changes based on the inclination and the movement of the operation section 160. Therefore, the operation section 160 according to this embodiment can input the inclination and the movement of the operation section 160 as operation data.

The detection section 162 (e.g., acceleration sensor, position sensor, or gyro sensor) detects changes in position and direction from a reference position and a reference direction (reference axis) based on acceleration, angular velocity, and speed. For example, the detection section 162 may be implemented using hardware such as a piezoelectric acceleration sensor, an electrodynamic acceleration sensor, or a strain gauge acceleration sensor. The detection section 162 can thus detect the inclination and the movement of the operation section 160 as successive values.

The operation section 160 may also include a lever, a button, a steering wheel, a microphone, a touch panel display, or the like so that various types of operation data can be input.

A storage section 170 serves as a work area for a processing section 100, a communication section 196, and the like. The function of the storage section 170 may be implemented by a RAM (VRAM) or the like. The storage section 170 according to this embodiment includes a main storage section 171 used as a work area, a frame buffer 172 that stores the final display image and the like, an object data storage section 173 that stores object model data, a texture storage section 174 that stores the texture for object data, and a Z buffer 176 that stores a Z value when an image of an object is generated. Note that the storage section 170 may have a configuration in which some of these sections are omitted.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like.

The information storage medium 180 stores a program (data) that causes the processing section 100 to execute various processes according to this embodiment. Specifically, the information storage medium 180 stores a program that causes a computer to function as each section according to this embodiment (i.e., a program that causes a computer to perform the process of each section).

A display section 190 outputs an image generated according to this embodiment. The function of the display section 190 may be implemented by a CRT, an LCD, a touch panel display, or the like.

A sound output section 192 outputs sound generated according to this embodiment. The function of the sound output section 192 may be implemented by a speaker, a headphone, or the like.

A portable information storage device 194 stores a player's personal data, game save data, and the like. The portable information storage device 194 may be a memory card, a portable game device, or the like.

The communication section 196 performs various types of control for communicating with the outside (e.g., a host device or an image generation system). The function of the communication section 196 may be implemented by hardware such as a processor or a communication ASIC, a program, or the like.

A program (data) that causes a computer to function as each section according to this embodiment may be distributed to the information storage medium 180 (storage section 170) from an information storage medium included in a host device (server) through a network and the communication section 196. Use of the information storage medium of the host device (server) is also included within the scope of the invention.

The processing section 100 (processor) performs a game process, an image generation process, a sound generation process, and the like based on operation data from the operation section 160, a program, and the like. The game process includes starting the game when game start conditions have been satisfied, proceeding with the game, disposing an object such as a character or a map, displaying an object, calculating game results, finishing the game when game end conditions have been satisfied, and the like. The processing section 100 performs various processes using the storage section 170 as a work area. The function of the processing section 100 may be implemented by hardware such as a processor (e.g. CPU or DSP) or an ASIC (e.g. gate array), or a program.

The processing section 100 according to this embodiment includes an information acquisition section 108, an object space setting section 110, a movement control section 112 (shift angle calculation section, first force vector calculation section, second force vector calculation section, third force vector calculation section, fourth force vector calculation section, resultant force vector calculation section, and update section), a motion control section 114, an event generation section 115, a state setting section 116, a display control section 117, and a sound generation section 130. Note that the processing section 100 may have a configuration in which some of these sections are omitted.

The information acquisition section 108 acquires inclination information relating to the operation section 160 based on the detection result of the detection section 162 that detects the information which changes according to the inclination of the operation section 160. In this embodiment, the information acquisition section 108 acquires the detection result of the detection section 162 provided in the operation section 160 every 1/200th of a second.

The information acquisition section 108 acquires information relating to the inclination of each of the first operation section 160 and the second operation section 160.

The information acquisition section 108 acquires the information relating to the inclination of the operation section 160 as information that differs in sign depending on the inclination direction.

The information acquisition section 108 acquires information relating to the movement of the operation section 160 based on the detection result of the detection section 162 that detects information which changes according to the movement of the operation section 160.

The information acquisition section 108 acquires the inclination, movement, and speed of the operation section 160 based on the acceleration vectors in three axial (X axis, Y axis, and Z axis) directions detected by the acceleration sensor (detection section) provided in the operation section 160.

The object space setting section 110 disposes various objects (objects formed by a primitive plane such as a polygon, a free-form surface, or a subdivision surface) which represent display objects (e.g., moving object (moving object MO), character object, building, tree, pillar, wall, or map (map that indicates a slope)) in an object space. Specifically, the object space setting section 110 determines the position and the rotational angle (synonymous with orientation or direction) of an object (model object) in a world coordinate system, and disposes the object at the determined position (X, Y, Z) and the determined rotational angle (rotational angles around X, Y, and Z axes).

The movement control section 112 calculates the movement of the moving object (i.e., movement simulation). Specifically, the movement control section 112 moves the moving object in the object space based on operation data input by the player using the operation section 160, a parameter or an attribute that has been set, a program (movement algorithm), and the like.

Specifically, the movement control section 112 according to this embodiment performs a simulation process that sequentially calculates the object movement information (position, rotational angle, speed, or acceleration) every frame (e.g., 1/60th of a second). The term "frame" refers to a time unit in which the object movement process (simulation process) or the image generation process is performed. In this embodiment, the frame rate may be fixed, or may be changed according to the processing load.

The movement control section 112 according to this embodiment calculates the shift angle based on the magnitude of the velocity vector of the moving object and the inclination information relating to the operation section 160, and calculates the direction of the moving object on the slope based on the shift angle and the direction of the velocity vector of the moving object. The movement control section 112 calculates the first force vector in the direction intersecting at right angles on the slope with the direction of the moving object on the slope based on the inclination information relating to the operation section 160. The movement control section 112 calculates the second force vector based on the slope angle of the slope. The movement control section 112 calculates the resultant force vector by combining the first force vector and the second force vector. The movement control section 112 updates the velocity vector of the moving object based on the resultant force vector, and updates the position of the moving object based on the updated velocity vector.

The movement control section 112 calculates the first force vector based on the magnitude of the velocity vector of the moving object and the inclination information relating to the operation section 160.

The movement control section 112 calculates the shift angle based on the magnitude of the velocity vector of the moving object and the inclination information relating to each operation section 160, and calculates the first force vector based on the inclination information relating to each operation section 160.

The movement control section 112 calculates the first force vector based on the plus or minus sign of the inclination information relating to each operation section 160.

The movement control section 112 calculates the third force vector that indicates the air resistance applied to the moving object based on the plus or minus sign of the inclination information relating to each operation section 160, and calculates the resultant force vector by combining the second force vector and the third force vector.

The movement control section 112 calculates the fourth force vector that indicates the frictional force applied to the moving object based on the plus or minus sign of the inclination information relating to each operation section 160, and calculates the resultant force vector by combining the second force vector and the fourth force vector.

When the value of the inclination information relating to the operation section 160 has not reached a predetermined threshold value, the movement control section 112 changes the shift angle within the first angular range based on the magnitude of the velocity vector of the moving object and the inclination information relating to the operation section 160. When the value of the inclination information relating to the operation section 160 has reached a predetermined threshold value, the movement control section 112 changes the shift angle to a predetermined angle outside the first angular range.

When the slope angle of the slope where the moving object set in the stationary state is positioned is equal to or larger than a predetermined angle and the direction of the moving object on the slope is within the second angular range, the movement control section 112 changes the direction of the moving object on the slope to a predetermined direction outside the second angular range.

The movement control section 112 calculates the second force vector based on the slope angle of the slope and the movement information relating to the operation section 160.

The motion control section 114 calculates the motion of the moving object (i.e., motion simulation). Specifically, the motion control section 114 controls the motion (animation) of the moving object based on the operation data input by the player using the operation section 160, a parameter or an attribute that has been set, a program (motion algorithm), various types of data (motion data), and the like. Specifically, the motion control section 114 according to this embodiment performs a simulation process that sequentially calculates the object motion information (position or rotational angle of each part object) every frame (e.g., 1/60th of a second).

The motion control section 114 according to this embodiment controls the motion of the moving object based on a change in the inclination information relating to the operation section 160 within a predetermined period.

The motion control section 114 controls the motion of the moving object that moves in the direction away from the slope based on the movement information relating to the operation section 160.

The event generation section 115 generates a given event based on the position of the moving object.

The state setting section 116 sets the moving object in the stationary state from the slide state when the magnitude of the velocity vector of the moving object has become equal to or smaller than a predetermined value.

The state setting section 116 sets the moving object in the stationary state in the slide state based on the direction of the virtual camera calculated by a virtual camera control section 118 and the movement information relating to the operation section 160.

The state setting section 116 may set the moving object in the stationary state in the slide state based on the movement information relating to the operation section 160 when the direction of the moving object on the slope is within the third angular range.

The state setting section 116 sets the moving object in the special state (i.e., the moving object is moved in a special balance) from the normal state (i.e., the moving object is moved in a normal balance) when an event has been generated by the event generation section 115.

The display control section 117 displays the moving object on the display section 190 based on the position and the direction of the moving object calculated by the movement control section 112 and the motion control section 114. Specifically, the display control section 117 includes the virtual camera control section 118 and a drawing section 120.

The virtual camera control section 118 controls the virtual camera (viewpoint) for generating an image viewed from a given (arbitrary) viewpoint in the object space. Specifically, the virtual camera control section 118 controls the position (X, Y, Z) or the rotational angle (rotational angles around X, Y, and Z axes) of the virtual camera (i.e., controls the viewpoint position or the line-of-sight direction).

In this embodiment, the virtual camera control section 118 controls the position or the rotational angle (direction) of the virtual camera so that the virtual camera follows a change in position or rotation of the moving object. In this case, the virtual camera control section 118 controls the virtual camera based on information such as the position, the rotational angle, or the speed of the moving object obtained by the movement control section 112. When the moving object is set in the stationary state, the virtual camera control section 118 controls the position or the direction of the virtual camera based on the operation data from the operation section 160. Alternatively, the virtual camera control section 118 may rotate the virtual camera by a predetermined rotational angle, or may move the virtual camera along a predetermined path. In this case, the virtual camera control section 118 controls the virtual camera based on virtual camera data for specifying the position (moving path) or the rotational angle of the virtual camera. When a plurality of virtual cameras (view points) are provided, the above-described control process is performed for each virtual camera.

The image generation section 120 performs a drawing process based on the results of various processes (game processes) performed by the processing section 100 to generate an image, and outputs the generated image to the display section 190. When the image generation section 120 according to this embodiment generates a three-dimensional game image, the image generation section 120 receives object data (model data) including vertex data (e.g. vertex position coordinates, texture coordinates, color data, normal vector, or alpha value) of each vertex of the object (model), and performs a vertex process based on the vertex data included in the input object data. When performing the vertex process, the image generation section 120 may perform a vertex generation process (tessellation, curved surface division, or polygon division) for subdividing the polygon, if necessary.

In the vertex process, the image generation section 120 performs a vertex movement process and a geometric process such as coordinate transformation (world coordinate transformation or camera coordinate transformation), clipping, perspective transformation, or light source process, and changes (updates or adjusts) vertex data of the vertices forming the object based on the processing results. The image generation section 120 performs rasterization (scan conversion) based on the vertex data after the vertex process so that the surface of the polygon (primitive) is associated with pixels. The image generation section 120 then performs a pixel process (fragment process) that draws pixels which form the image (fragments which form the display screen).

In the pixel process, the image generation section 120 determines the final drawing color of the pixel by performing various processes such as texture reading (texture mapping), color data setting/change, translucent blending, and antialiasing, and outputs (draws) the drawing color of the object subjected to perspective transformation to the frame buffer 172 (buffer which can store image information in pixel units; VRAM or rendering target). Specifically, the pixel process includes a per-pixel process that sets or changes the image information (e.g., color, normal, luminance, and alpha value) for each pixel.

An image viewed from the virtual camera (given viewpoint) set in the object space is thus generated. When a plurality of virtual cameras (viewpoints) are provided, an image may be generated so that images (divided images) viewed from the respective virtual cameras can be displayed on one screen.

The sound generation section 130 performs a sound generation process based on the results of various processes performed by the processing section 100 to generate game sound such as background music (BGM), effect sound, or voice, and outputs the generated game sound to the sound output section 192.

The image generation system according to this embodiment may be configured as a system dedicated to a single-player mode in which only one player can play the game, or may be configured as a system that also enables a multi-player mode in which a plurality of players can play a game.

When a plurality of players play the game, the game image and the game sound supplied to these players may be generated using one terminal, or may be generated by a distributed process using a plurality of terminals (game devices or portable telephones) connected via a network (transmission line or communication line), for example.

4. Process According to this Embodiment

An example of the process according to this embodiment is described below with reference to flowcharts shown in FIGS. 19 and 20.

Figure 19:
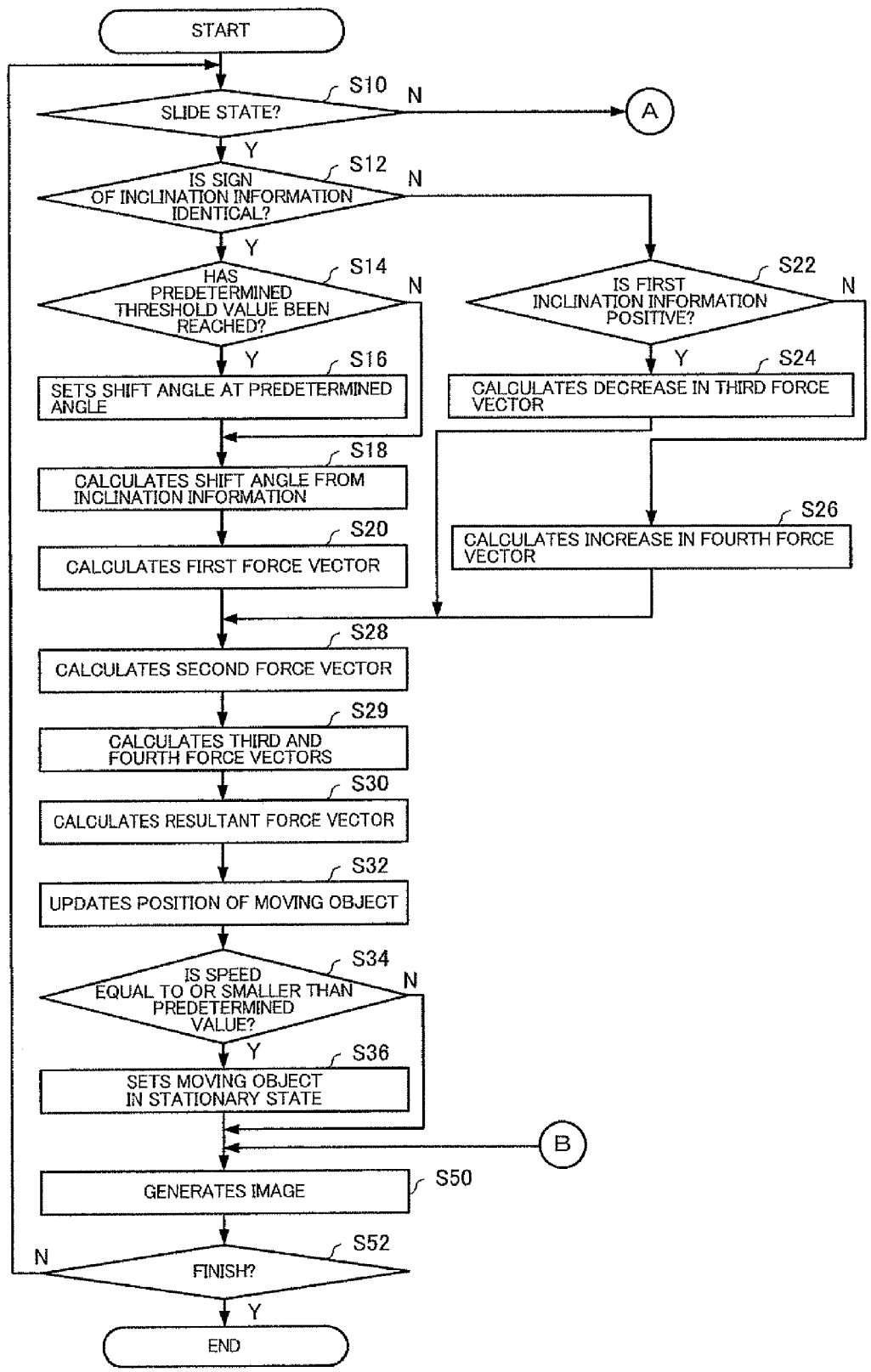
FIG. 19 is a flowchart showing an example of a process according to one embodiment of the invention.

Whether or not the moving object MO is set in the slide state is determined (step S10 in FIG. 19). When the moving object MO has been determined to be set in the slide state in the step S10, whether or not the plus or minus sign of the acceleration information (inclination information) acquired from the X axis output of the acceleration sensor of each of the first controller 16 and the second controller 18 is identical is determined (step S12). When the sign of the acceleration information has been determined to be identical in the step S12, whether or not (the absolute value of) the average of the acceleration information acquired from the X axis output of each acceleration sensor has reached a predetermined threshold value is determined (step S14). When the average of the acceleration information has been determined to have reached the predetermined threshold value in the step S14, the shift angle A is set at a predetermined angle (90°), and the direction D of the moving object on the slope is calculated based on the shift angle A and the direction of the velocity vector S of the moving object (step S16).

When the average of the acceleration information has been determined to have not reached the predetermined threshold value in the step S14, the shift angle is calculated based on the magnitude of the velocity vector S of the moving object and the average of the acceleration information acquired from the acceleration sensor of each controller, and the direction D of the moving object is calculated based on the calculated shift angle and the direction of the velocity vector S of the moving object (step S18). When the sign of the average of the acceleration information acquired in the steps S12 and S14 is a plus sign, the shift angle A for changing the direction D of the moving object to the right with respect to the direction of the velocity vector S is calculated. When the sign of the average of the acceleration information is a minus sign, the shift angle A for changing the direction D of the moving object to the left with respect to the direction of the velocity vector S is calculated.

The first force vector P1 in the direction intersecting at right angles on the slope with the direction D of the moving object is calculated based on the magnitude of the velocity vector S of the moving object and the average of the acceleration information acquired from the acceleration sensor of each controller (step S20).

When the sign of the acceleration information has been determined to differ in the step S12, whether or not the sign of the acceleration information (inclination information) acquired from the X axis output of the acceleration sensor of the first controller 16 is a plus sign is determined (step S22). When the sign of the acceleration information has been determined to be a plus sign in the step S22, the third force vector P3 that indicates the air resistance applied to the moving object MO is calculated (step S24).

When the sign of the acceleration information has been determined to be a minus sign in the step S22, an increase in the fourth force vector P4 that indicates the frictional force applied to the moving object MO is calculated (step S26).

The second force vector P2 is calculated based on the slope angle SA of the slope (step S28). When the acceleration information with a plus sign has been acquired from the Z axis output of the acceleration sensor of each controller and the average of the acquired acceleration information has exceeded a predetermined threshold value, the second force vector P2 may be calculated based on the slope angle SA of the slope and the average of the acceleration information acquired from the Z axis output of the acceleration sensor of each controller.

The third force vector P3 and the fourth force vector P4 are then calculated (step S29). The third force vector that indicates the air resistance applied to the moving object MO is calculated based on a parameter such as the type of the moving object MO. When a decrease in the third force vector P3 has been calculated in the step S24, the magnitude of the calculated third force vector P3 is decreased based on the amount of decrease. The fourth force vector P4 that indicates the frictional force applied to the moving object MO is calculated based on a parameter such as the type of skis and the state of the snow surface. When an increase in the fourth force vector P4 has been calculated in the step S26, the magnitude of the calculated fourth force vector P4 is increased based on the amount of increase.

The resultant force vector PS is calculated by combining the force vectors thus calculated (step S30). When the first force vector P1 has been calculated in the step S20, the resultant force vector PS is calculated by combining the first force vector P1, the second force vector P2, the third force vector P3, and the fourth force vector P4. When the third force vector P3 has been calculated in the step S24 and the fourth force vector P4 has been calculated in the step S26, the resultant force vector PS is calculated by combining the second force vector P2, the third force vector P3, and the fourth force vector P4.

The velocity vector S is updated based on the resultant force vector PS and the velocity vector S of the moving object, and the position of the moving object MO is updated based on the updated velocity vector S (step S32).

Whether or not the magnitude of the updated velocity vector S of the moving object has become equal to or smaller than a predetermined value is determined (step S34). When the magnitude of the velocity vector S of the moving object has been determined to have become equal to or smaller than the predetermined value in the step S34, the moving object MO is set in the stationary state (step S36). When the magnitude of the velocity vector S of the moving object has been determined to have not become equal to or smaller than the predetermined value in the step S34, the process proceeds to a step S50.

Figure 20:
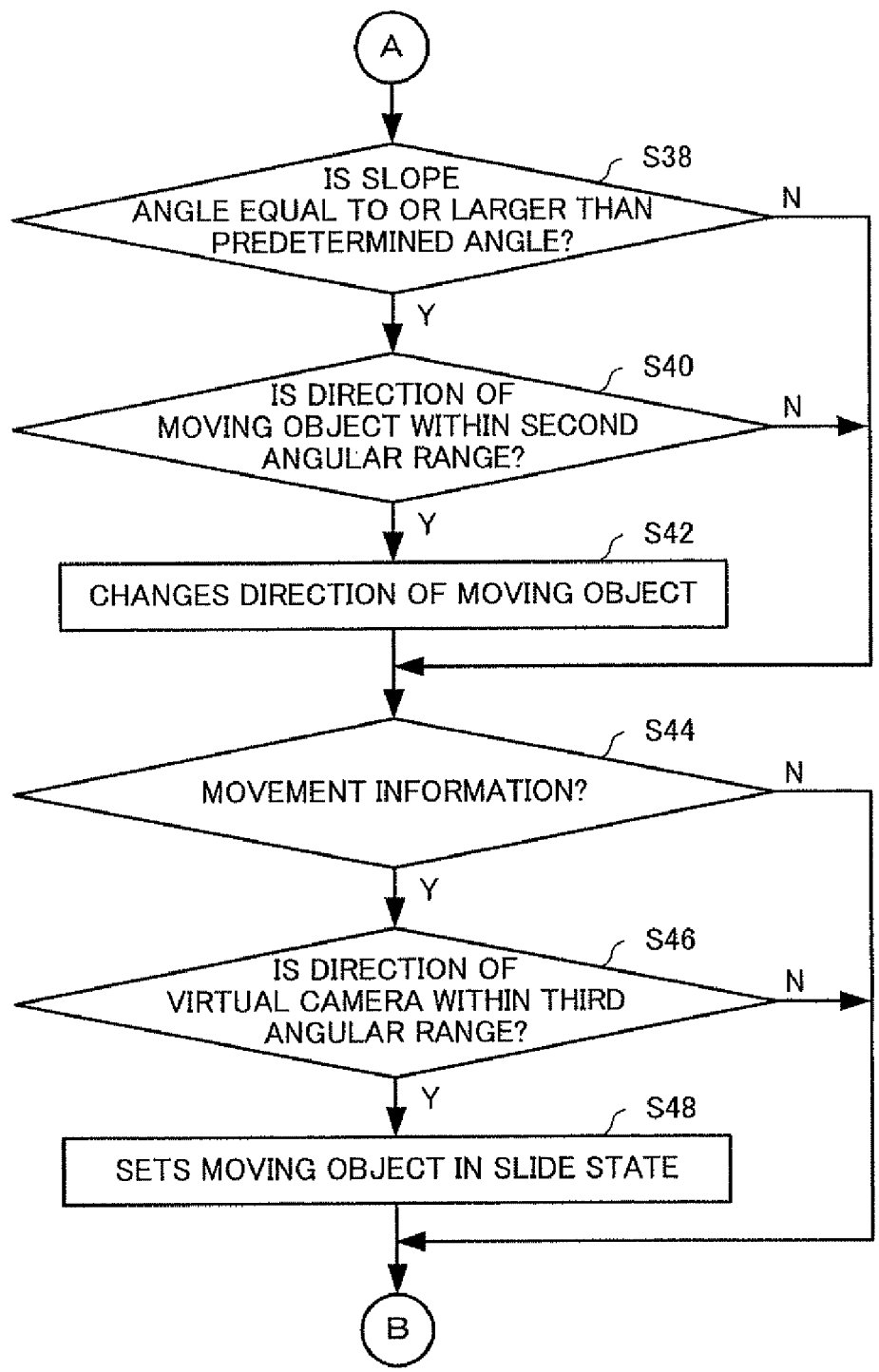
FIG. 20 is a flowchart showing an example of a process according to one embodiment of the invention.

When the moving object MO has been determined to be not set in the slide state in the step S10 (i.e., stationary state), whether or not the slope angle SA of the slope where the moving object MO is positioned is equal to or larger than a predetermined angle is determined (step S38 in FIG. 20). When the slope angle SA of the slope has been determined to be equal to or larger than the predetermined angle in the step S38, whether or not the direction D of the moving object on the slope is within the second angular range A2 is determined (step S40). When the direction D of the moving object has been determined to be within the second angular range A2 in the step S40, the direction D of the moving object on the slope is changed to a predetermined direction (step S42).

The value of the acceleration information with a plus sign has been acquired from the Z axis output of the acceleration sensor of each controller, and whether or not the average of the acquired acceleration information has exceeded a predetermined threshold value are determined (step S44). When the average of the acceleration information has been determined to have exceeded the predetermined threshold value in the step S44, whether or not the direction CD of the virtual camera is within the third angular range A3 is determined (step S46). When the direction CD of the virtual camera has been determined to be within the third angular range A3 in the step S46, the moving object MO is set in the slide state (step S48).

The drawing process is performed based on the position and the direction of moving object MO updated to generate an image (step S50 in FIG. 19).

Whether or not to continue the process is determined (step S52). When the process is continuously performed, the process returns to the step S10, and the process from the step S10 is repeated every ⅟₆₀th of a second.

The invention is not limited to the above-described embodiments. Various modifications and variations may be made. For example, any term cited with a different term having a broader meaning or the same meaning at least once in the specification and the drawings may be replaced by the different term in any place in the specification and the drawings.

The above embodiments have been described taking an example in which the shift angle A and the first force vector P1 are calculated based on the inclination information that indicates the inclination of each of the first controller 16 and the second controller 18 held by the player. Note that center of gravity shift information that indicates the shift in the center of gravity of the player on a third controller may be acquired based on the detection result of a detection section that detects information which changes according to the shift in the center of gravity (weight) of the player on the third controller. The first force vector P1 may be calculated based on the center of gravity shift information, and the shift angle A may be calculated based on the inclination information relating to the first controller and the second controller. The shift angle A may be calculated based on the center of gravity shift information that indicates the shift in the center of gravity of the player on the third controller, and the first force vector P1 may be calculated based on the inclination information relating to the first controller and the second controller.

The invention may be applied to various game systems such as an arcade game system, a consumer game system, a portable game system, and a system board that generates a game image.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A non-transitory computer-readable storage medium storing a program that generates an image in which a moving object slides down a slope according to an inclination of a controller, the program causing a computer to function as:
    an information acquisition section that acquires inclination information that indicates an inclination of the controller based on a detection result of a detection section that detects information that changes according to an inclination of the controller;
    a shift angle calculation section that calculates a shift angle based on a magnitude of a velocity vector of the moving object and the inclination information, and calculates a direction of the moving object on the slope based on the shift angle and a direction of the velocity vector of the moving object;
    a first force vector calculation section that calculates a first force vector in a direction intersecting at right angles on the slope with the direction of the moving object on the slope based on the inclination information, the direction intersecting at right angles corresponding to at least a minimum rotation of the moving object around a z-axis of an object space that contains the moving object;
    a second force vector calculation section that calculates a second force vector based on a slope angle of the slope;
    a resultant force vector calculation section that calculates a resultant force vector by combining the first force vector and the second force vector;
    an update section that updates the velocity vector of the moving object based on the resultant force vector, and updates a position of the moving object based on the updated velocity vector; and
    an image generation section that generates an image including the moving object, wherein
    the shift angle calculation section changes the shift angle within a first angular range based on a magnitude of the velocity vector of the moving object and the inclination information when a value of the inclination information has not reached a predetermined threshold value, and changes the shift angle to a predetermined angle outside the first angular range when a value of the inclination information has reached the predetermined threshold value.

2. The program as defined in claim 1,
    wherein the first force vector calculation section calculates the first force vector based on the magnitude of the velocity vector of the moving object and the inclination information.

3. The program as defined in claim 1,
    wherein the information acquisition section acquires first inclination information indicating an inclination of a first controller and second inclination information indicating an inclination of a second controller;
    wherein the shift angle calculation section calculates the shift angle based on a magnitude of the velocity vector of the moving object, the first inclination information, and the second inclination information; and wherein the first force vector calculation section calculates the first force vector based on the first inclination information and the second inclination information.

4. The program as defined in claim 3, wherein the information acquisition section acquires the first inclination information and the second inclination information each indicating a plus or minus sign depending on an inclination direction of the first or second controllers; and wherein the first force vector calculation section calculates the first force vector based on the plus or minus sign of the first inclination information and the second inclination information.

5. The program as defined in claim 4, further causing the computer to function as:

a third force vector calculation section that calculates a third force vector that indicates air resistance applied to the moving object based on the plus or minus sign of the first inclination information and the second inclination information, wherein the resultant force vector calculation section calculates the resultant force vector by combining the second force vector and the third force vector when the third force vector has been calculated by the third force vector calculation section.

6. The program as defined in claim 4, further causing the computer to function as:

a fourth force vector calculation section that calculates a fourth force vector that indicates a frictional force applied to the moving object based on the plus or minus sign of the first inclination information and the second inclination information, wherein the resultant force vector calculation section calculates the resultant force vector by combining the second force vector and the fourth force vector when the fourth force vector has been calculated by the fourth force vector calculation section.

7. The program as defined in claim 1, further causing the computer to function as:

a state setting section that sets the moving object in a stationary state in which the moving object is stationary from a slide state in which the moving object moves when a magnitude of the velocity vector of the moving object has become equal to or smaller than a predetermined value.

8. The program as defined in claim 7, wherein, when the slope angle of the slope where the moving object is positioned is equal to or larger than a predetermined angle and the direction of the moving object on the slope is within a second angular range in the stationary state, the shift angle calculation section changes the direction of the moving object on the slope to a predetermined direction outside the second angular range.

9. The program as defined in claim 7, further causing the computer to function as:

a virtual camera control section that controls the position and the direction of a virtual camera, wherein the information acquisition section acquires movement information that indicates a movement of the controller based on a detection result of the detection section that detects information that changes according to a movement of the controller; and wherein the state setting section changes a state of the moving object from the stationary state to the slide state based on the direction of the virtual camera and the movement information.

10. The program as defined in claim 1, wherein the information acquisition section acquires movement information that indicates a movement of the controller based on a detection result of the detection section that detects information that changes according to a movement of the controller; and wherein the second force vector calculation section calculates the second force vector based on the slope angle of the slope and the movement information.

11. The program as defined in claim 1, further causing the computer to function as:

a motion control section that controls motion of the moving object, wherein the motion control section controls the motion of the moving object based on a change in the inclination information within a predetermined period.

12. The program as defined in claim 1, further causing the computer to function as:

a motion control section that controls motion of the moving object, wherein the information acquisition section acquires movement information that indicates a movement of the controller based on a detection result of the detection section that detects information that changes according to a movement of the controller; and wherein the motion control section controls the motion of the moving object that moves in a direction away from the slope based on the movement information.

13. The program as defined in claim 7, further causing the computer to function as:

an event generation section that generates a given event based on a position of the moving object, wherein the state setting section changes a state of the moving object from a normal state in which the moving object moves in a normal balance to a special state in which the moving object moves in a special balance based on generation of the event.

14. A computer-readable information storage medium storing the program as defined in claim 1.

15. A game device that generates an image in which a moving object slides down a slope according to an inclination of a controller, the game device comprising:

an information acquisition section that acquires inclination information that indicates an inclination of the controller based on a detection result of a detection section that detects information that changes according to an inclination of the controller;

a shift angle calculation section that calculates a shift angle based on a magnitude of a velocity vector of the moving object and the inclination information, and calculates a direction of the moving object on the slope based on the shift angle and a direction of the velocity vector of the moving object;

a first force vector calculation section that calculates a first force vector in a direction intersecting at right angles on the slope with the direction of the moving object on the slope based on the inclination information, the direction intersecting at right angles corresponding to at least a minimum rotation of the moving object around a z-axis of an object space that contains the moving object;

a second force vector calculation section that calculates a second force vector based on a slope angle of the slope;

a resultant force vector calculation section that calculates a resultant force vector by combining the first force vector and the second force vector;

an update section that updates the velocity vector of the moving object based on the resultant force vector, and updates a position of the moving object based on the updated velocity vector; and an image generation section that generates an image including the moving object, wherein the shift angle calculation section changes the shift angle within a first angular range based on a magnitude of the velocity vector of the moving object and the inclination information when a value of the inclination information has not reached a predetermined threshold value, and changes the shift angle to a predetermined angle outside the first angular range when a value of the inclination information has reached the predetermined threshold value.

16. The program of claim 1, wherein the slope varies in more than one orthogonal direction.

17. The program of claim 1, wherein the resultant force vector reduces the velocity vector of the moving object in the direction of the moving object.

* * * * *